(12) United States Patent
 Azuma

(10) Patent No.: US 11,153,301 B2
(45) Date of Patent: Oct. 19, 2021

(54) COMMUNICATION SYSTEM AND METHOD FOR MANAGING GUEST USER NETWORK CONNECTIONS

(71) Applicant: RICOH COMPANY, LTD., Tokyo (JP)

(72) Inventor: Yoshikazu Azuma, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/570,526

(22) PCT Filed: Apr. 14, 2016

(86) PCT No.: PCT/JP2016/002033
 § 371 (c)(1),
 (2) Date: Oct. 30, 2017

(87) PCT Pub. No.: WO2016/178304
 PCT Pub. Date: Nov. 10, 2016

(65) Prior Publication Data
 US 2018/0145961 A1 May 24, 2018

(30) Foreign Application Priority Data
 May 1, 2015 (JP) .............................. JP2015-094332

(51) Int. Cl.
 *H04L 29/06* (2006.01)
 *H04W 12/06* (2021.01)
 (Continued)

(52) U.S. Cl.
 CPC .......... *H04L 63/083* (2013.01); *G06F 21/608* (2013.01); *H04L 41/08* (2013.01);
 (Continued)

(58) Field of Classification Search
 CPC ..... H04L 63/083; H04L 41/08; H04L 63/105; H04L 63/107; H04L 67/34; H04W 76/10;
 (Continued)

(56) References Cited

U.S. PATENT DOCUMENTS 7,676,675 B2 3/2010 Billharz et al.
8,533,798 B2 9/2013 Schenk
 (Continued)

FOREIGN PATENT DOCUMENTS

CN 104484797 A 4/2015
EP 2 443 875 B1 7/2013
 (Continued)

OTHER PUBLICATIONS

Extended European Search Report dated Feb. 2, 2018 in European Patent Application No. 16789443.5, citing documents AA, AO, AP and AQ therein, 7 pages.
 (Continued)

*Primary Examiner* — Eleni A Shiferaw
*Assistant Examiner* — Bassam A Noaman
(74) *Attorney, Agent, or Firm* — Xsensus LLP

(57) ABSTRACT

A communication system and method for managing guest user network connections includes: a first communicator configured to communicate with a terminal apparatus; an authentication unit configured to transmit an authentication screen for inputting authentication information by a guest user accessing the terminal apparatus; a connection guiding unit configured to connect communication made from the terminal apparatus via the first communicator to the authentication unit; a display unit configured to display the authentication information input to the authentication screen and output by the terminal apparatus that has been connected to the authentication unit by the connection guiding unit and to which the authentication screen has been transmitted; and a connection control unit configured to permit connection of the terminal apparatus to a network via a second communicator in accordance with a host user input received by the input unit according to a display by the display unit.

11 Claims, 12 Drawing Sheets

(51) Int. Cl.
*G06F 21/60* (2013.01)
*H04W 12/50* (2021.01)
*H04W 76/10* (2018.01)
*H04L 12/24* (2006.01)
*H04W 84/12* (2009.01)
*H04L 29/08* (2006.01)
*H04W 12/68* (2021.01)

(52) U.S. Cl.
CPC ........... *H04L 63/105* (2013.01); *H04W 12/06* (2013.01); *H04W 12/50* (2021.01); *H04W 76/10* (2018.02); *H04L 63/107* (2013.01); *H04L 67/34* (2013.01); *H04W 12/68* (2021.01); *H04W 84/12* (2013.01)

(58) Field of Classification Search
CPC ........... H04W 12/06; H04W 12/00508; H04W 84/12; G06F 21/608
See application file for complete search history.

(56) References Cited

U.S. PATENT DOCUMENTS

| | | |
|---|---|---|
| 8,666,899 B2 | 3/2014 | Kurihara et al. |
| 8,744,970 B2 | 6/2014 | Kurihara et al. |
| 9,276,918 B2 | 3/2016 | Araki et al. |
| 9,277,491 B2 | 3/2016 | Smedman |
| 2004/0250130 A1 | 12/2004 | Billharz et al. |
| 2006/0116934 A1 | 6/2006 | Kurihara et al. |
| 2006/0190991 A1 | 8/2006 | Iyer |
| 2008/0162363 A1 | 7/2008 | Kurihara et al. |
| 2009/0282467 A1 | 11/2009 | Schenk |
| 2012/0095936 A1* | 4/2012 | Moyse .................. G06Q 40/00 705/36 R |
| 2012/0192257 A1* | 7/2012 | Ishii ..................... H04N 1/4433 726/7 |
| 2012/0209934 A1 | 8/2012 | Smedman |
| 2013/0034046 A1 | 2/2013 | Ishii et al. |
| 2013/0036458 A1* | 2/2013 | Liberman ............... G06F 21/31 726/6 |
| 2013/0174227 A1 | 7/2013 | Araki et al. |
| 2013/0174263 A1* | 7/2013 | Nunez Di Croce .. G06F 16/951 726/25 |
| 2013/0309971 A1 | 11/2013 | Kiukkonen et al. |
| 2013/0318352 A1 | 11/2013 | Ichikawa et al. |
| 2014/0189808 A1 | 7/2014 | Mahaffey et al. |
| 2015/0052258 A1* | 2/2015 | Johnson ................ H04L 67/141 709/228 |
| 2015/0078362 A1 | 3/2015 | Kunieda et al. |
| 2015/0172925 A1 | 6/2015 | Leppanen et al. |
| 2015/0181499 A1 | 6/2015 | Azuma |
| 2016/0028705 A1* | 1/2016 | Kawano .............. H04L 63/0838 726/4 |
| 2017/0048103 A1 | 2/2017 | Azuma |

FOREIGN PATENT DOCUMENTS

| | | |
|---|---|---|
| EP | 2 665 237 A1 | 11/2013 |
| JP | 07-084911 A | 3/1995 |
| JP | 2005-012775 A | 1/2005 |
| JP | 2005-064737 A | 3/2005 |
| JP | 2005-072980 A | 3/2005 |
| JP | 2006-222831 A | 8/2006 |
| JP | 2009-541843 A | 11/2009 |
| JP | 2013-038498 A | 2/2013 |
| JP | 2013-114358 A | 6/2013 |
| JP | 5645088 B2 | 11/2014 |
| JP | 2015-122556 A | 7/2015 |
| JP | 2016-012909 A | 1/2016 |
| WO | WO 2010/145882 A1 | 12/2010 |
| WO | WO 2013/160526 A1 | 10/2013 |

OTHER PUBLICATIONS

International Search Report and Written Opinion dated Jun. 7, 2016 in PCT/JP2016/002033 filed Apr. 14, 2016.
Horiuchi Kahori, "Easy to connect wireless LAN, correspond to BYOD with VLAN", Nikkei Network, Feb. 28, 2013, vol. 155, p. 57.
Japanese Office Action dated May 14, 2019, issued in corresponding Japanese Application No. 2015-094332, 3 pages.
European Communication pursuant to Article 94(3) dated Dec. 12, 2019, issued in corresponding European Patent Application No. 16 789 443.5-1218.
Chinese Office Action dated Dec. 6, 2019, issued in corresponding Chinese Patent Application No. 1201680025158.

* cited by examiner

[Fig. 1]
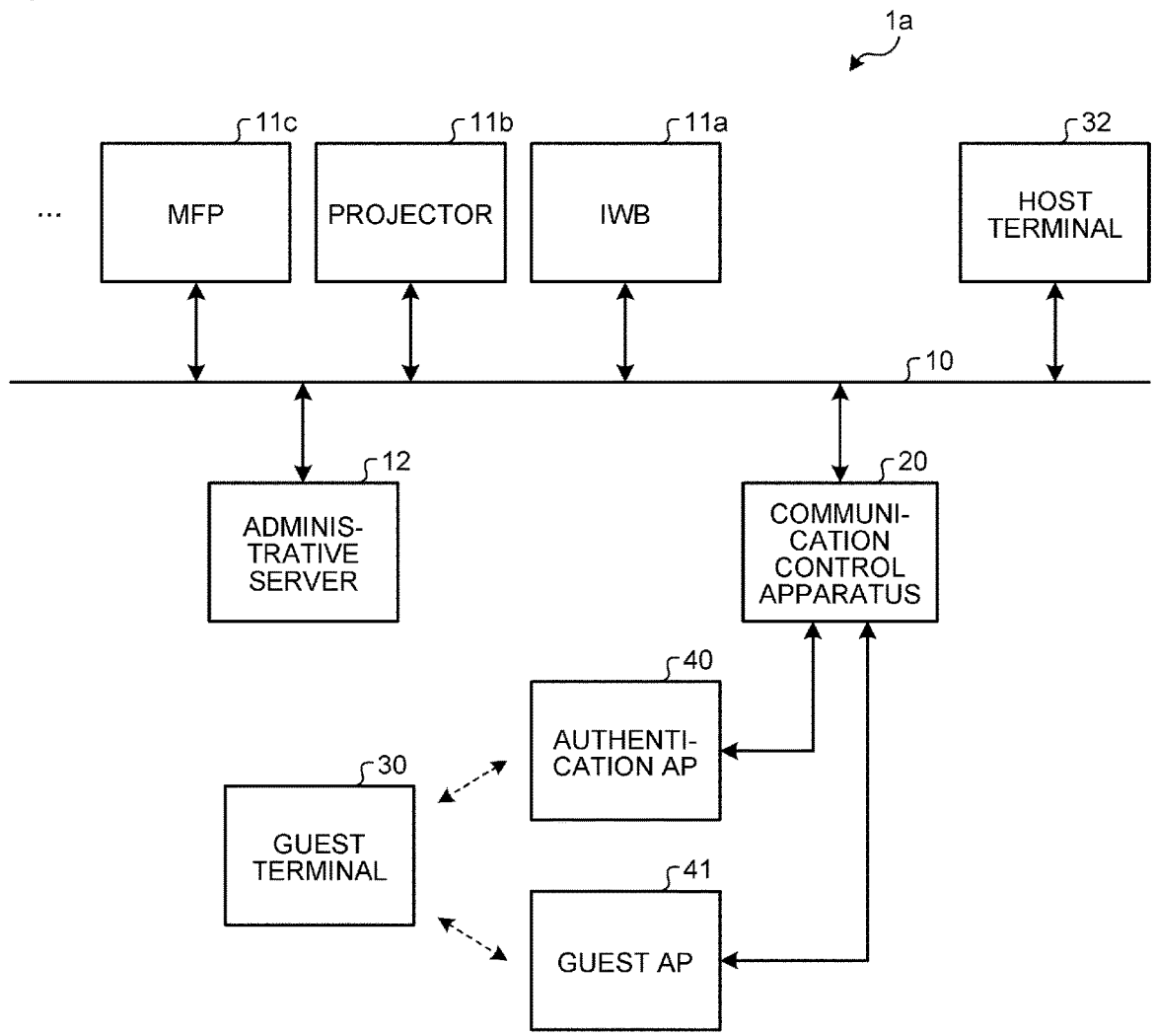
[Fig. 2]
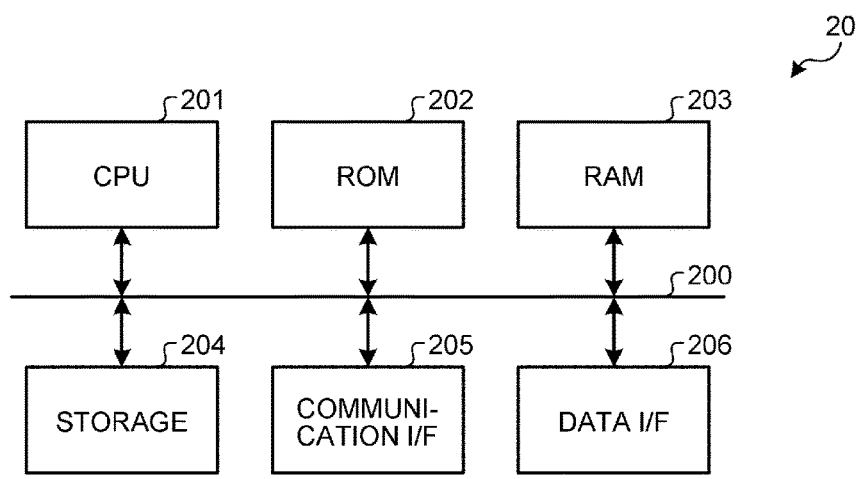

[Fig. 3]
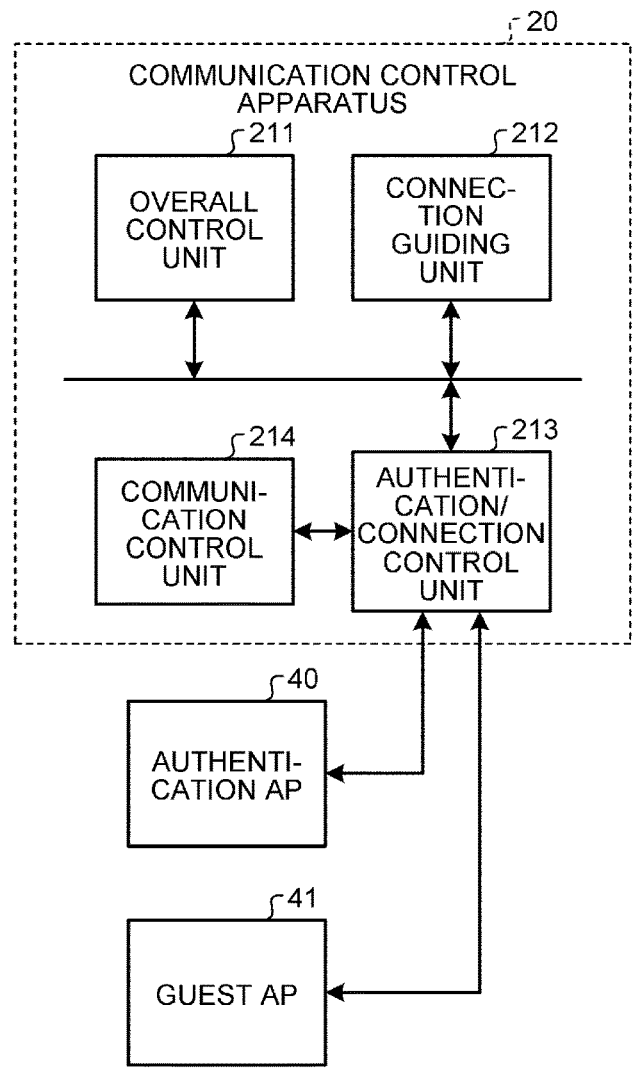
[Fig. 4]
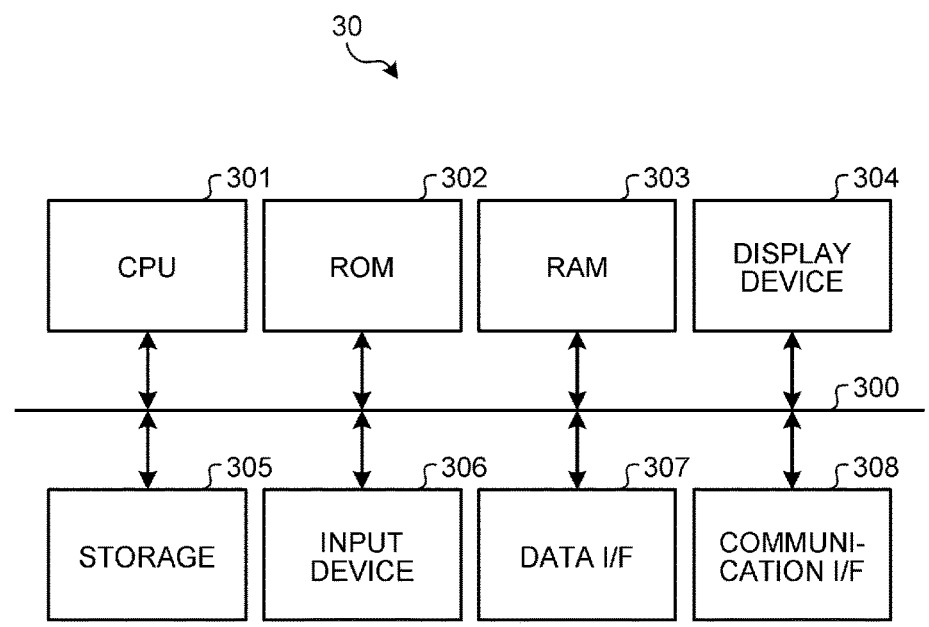

[Fig. 5]
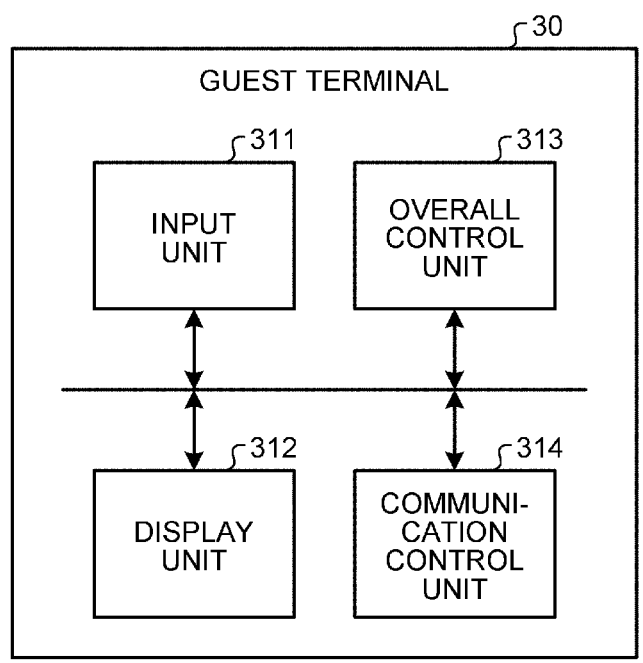
[Fig. 6]
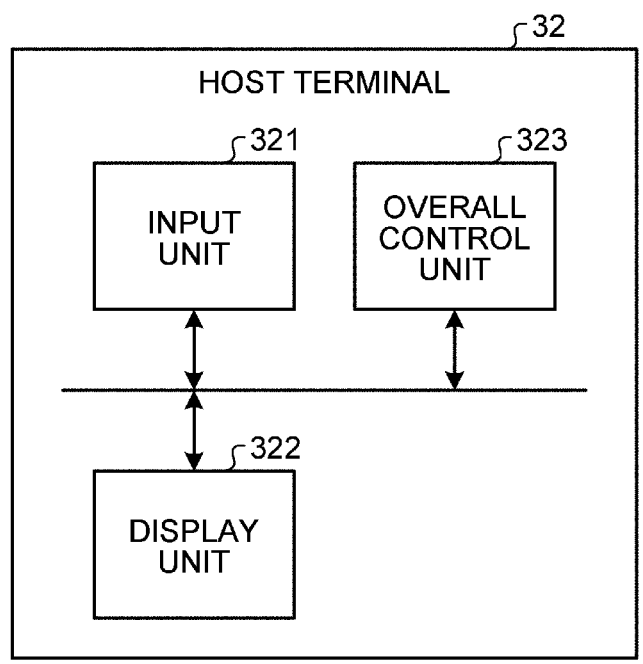

[Fig. 7]

```
                                                                    ┌420
  ┌─────────────────────────────────────────────────────────────┐
  │ (): CURRENT OPERATING VALUE                                 │
  │ ░PARAMETER MANAGEMENT (MENU FOR ADMINISTRATOR)░░░░░░░░░░░░░ │
  │                                                             │
  │   WIRELESS COMMUNICATION SETTING                            │
  │   ─────────────────────────────────────────────             │
  │    ■ WIRELESS COMMUNICATION    : ENABLED                    │
  │      SETTING                                                │
  │    ■ NEAR-FIELD COMMUNICATION  : ENABLED                    │
  │      SETTING                                                │
  │      RANDOM GENERATION OF        ○ NOT   ● APPLY ←──── 4210 │
  │    ■ GUEST WIRELESS LAN          : APPLY                    │
  │      SETTING                                                │
```

- WIRELESS COMMUNICATION SETTING (421)
  - WIRELESS COMMUNICATION SETTING : ENABLED
  - NEAR-FIELD COMMUNICATION SETTING : ENABLED
  - RANDOM GENERATION OF GUEST WIRELESS LAN SETTING : ○ NOT APPLY ● APPLY ← 4210

- FIXED-CONNECTION INFORMATION SETTING (422)
  - SSID
    - PSK : [_____] ← 4221
    - : ENTER ALPHANUMERIC CHARACTERS IN 1 TO 32 BYTES
  - SECURITY SETTING
    - AUTHENTICATION SCHEME : [Open ▼] ← 4222
    - ENCRYPTION SCHEME : [NO ENCRYPTION ▼]
  - PSK ← 4223
    - PSK : [_____]
    - PSK CONFIRMATION : [_____]
    - : ENTER ALPHANUMERIC CHARACTERS IN 8 TO 63 BYTES
  - ■ RATIO WAVE CONDITION : BEST (100%)

- ADMINISTRATOR AUTHORITY SETTING (423)
  - STATUS OF ADMINISTRATOR AUTHORITY SETTING : ENABLED
  - AUTHORITY TO PERMIT WIRELESS LAN CONNECTION
    - PERMISSION OF WIRELESS LAN CONNECTION TO GUEST : ● PERMITTED ○ NOT PERMITTED ← 4231
  - AUTHORITY TO GIVE PERMISSION USING WPS/WEB CAPTIVE PORTAL : [INVITER ▼] ← 4232
  - SIMPLIFIED SETUP VIA NEAR-FIELD COMMUNICATION : ○ ENABLED ● DISABLED ← 4233
  - TIME LIMIT FROM START : [2.0 ▼] HOURS ← 4234
  - TERMINATION OF GUEST WIRELESS LAN BASED ON TIME : ● APPLY ○ NOT APPLY ← 4235
  - AUTHORITY TO REGISTER AVAILABLE DEVICE
    - LIMITING AUTHORITY TO REGISTER AVAILABLE DEVICE TO ADMINISTRATOR : ○ APPLY ● NOT APPLY ← 4236

[ SET ] (424)    [ CANCEL ] (425)

[Fig. 8]
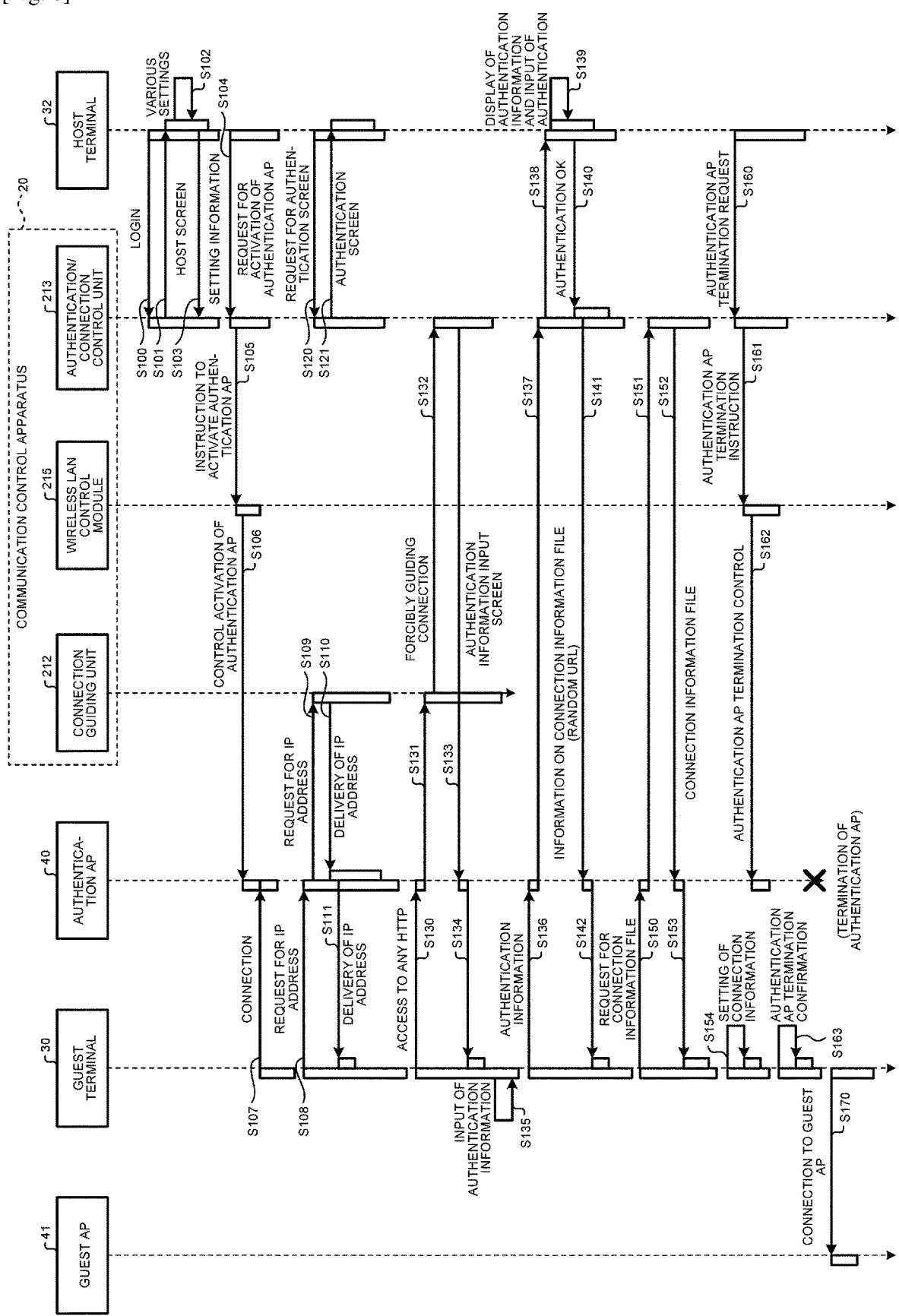

[Fig. 9]
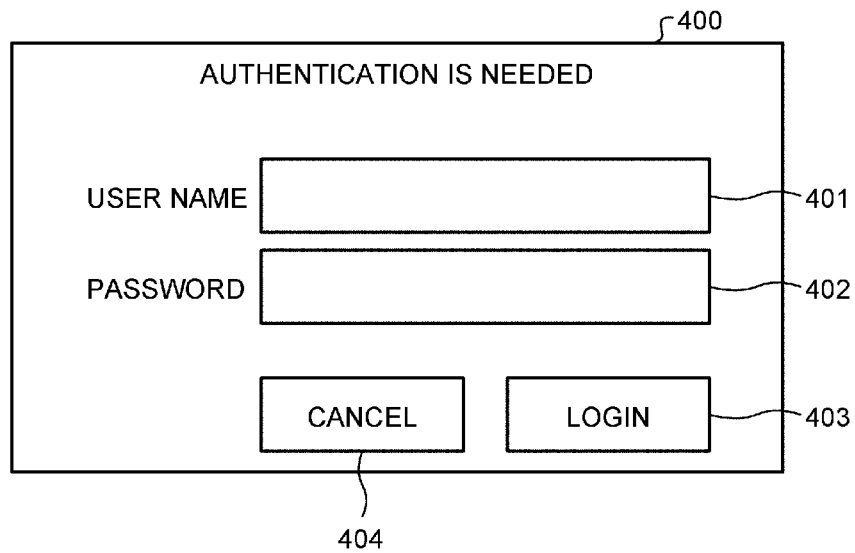
[Fig. 10]
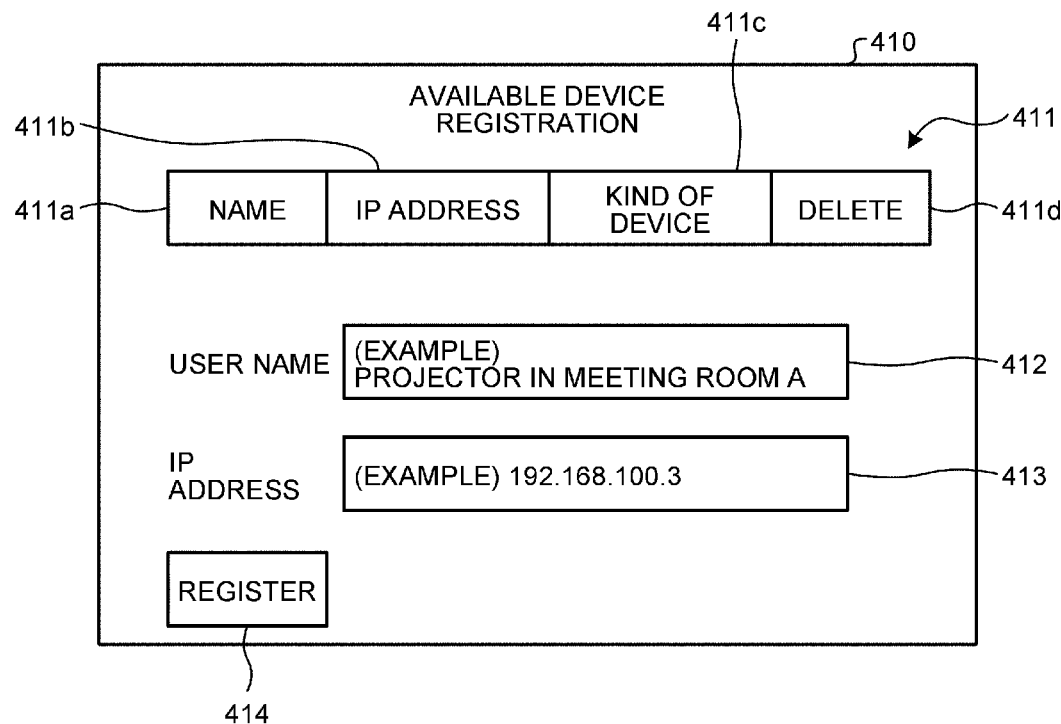

[Fig. 11]
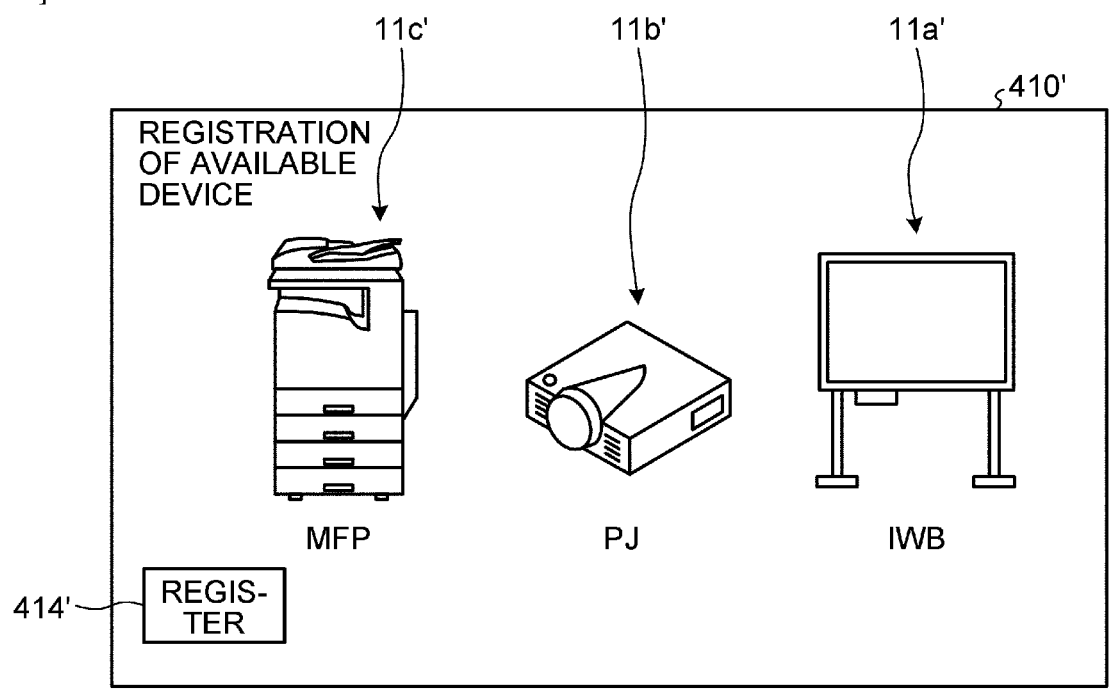

[Fig. 12]
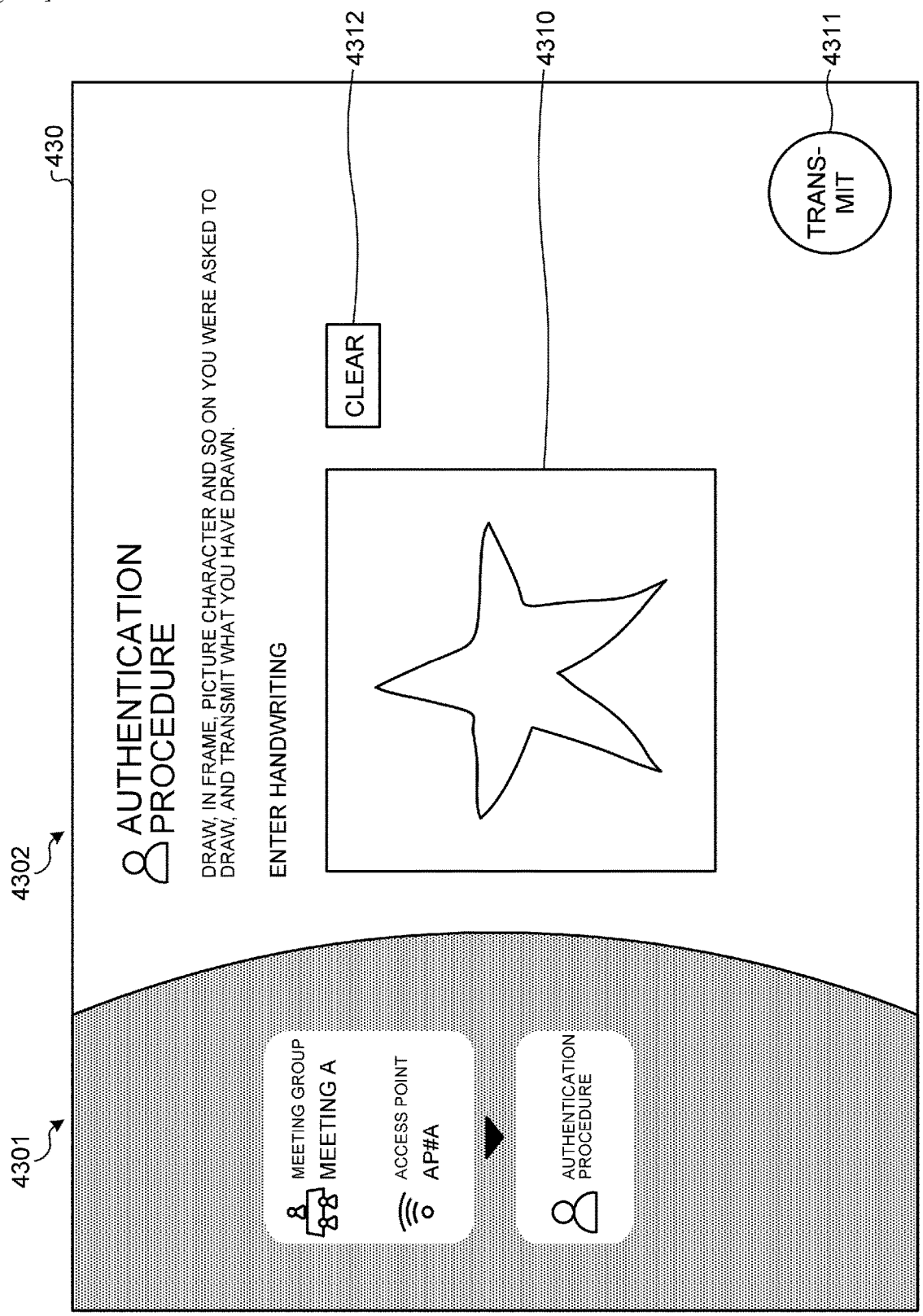

[Fig. 13]
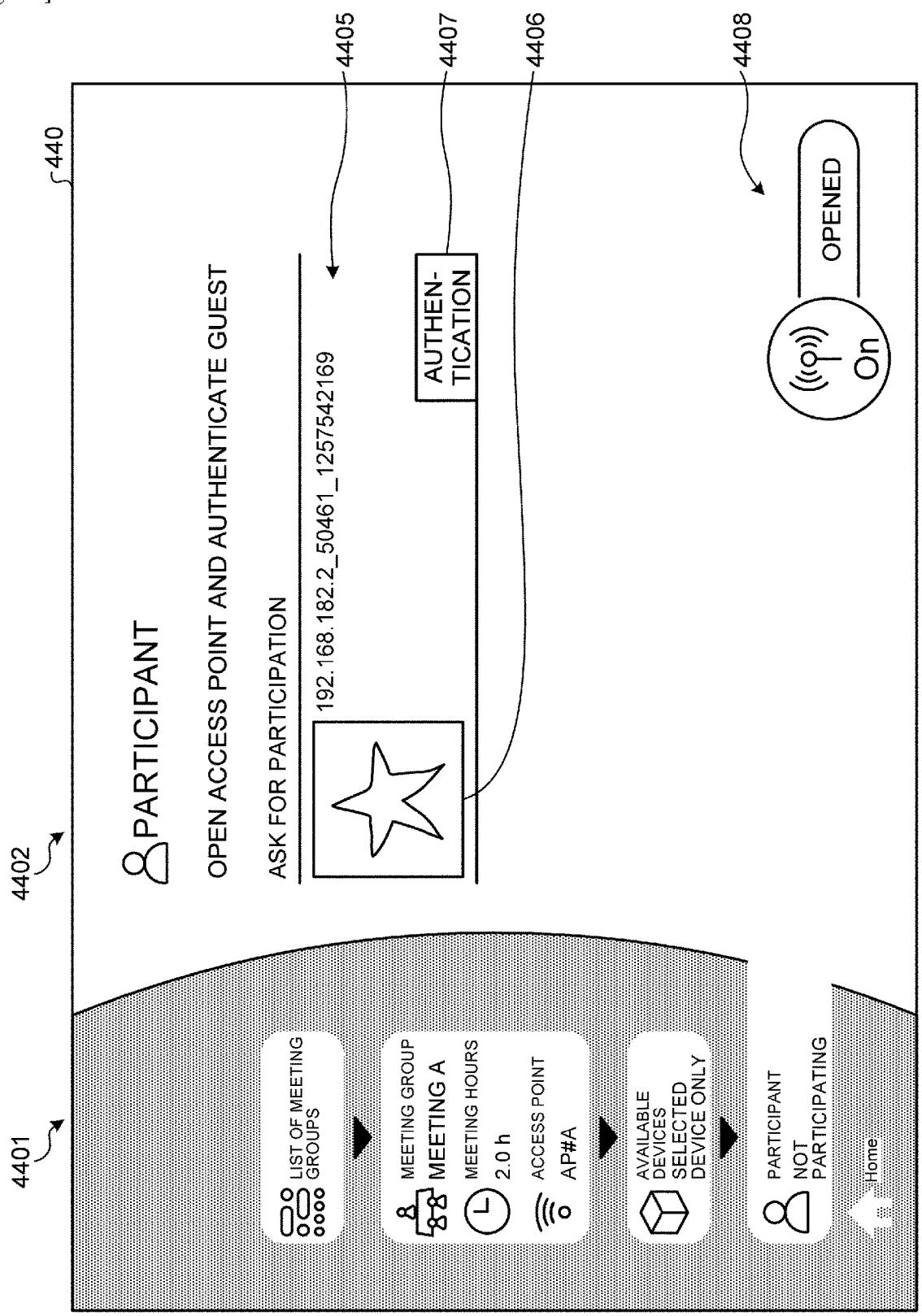

[Fig. 14]
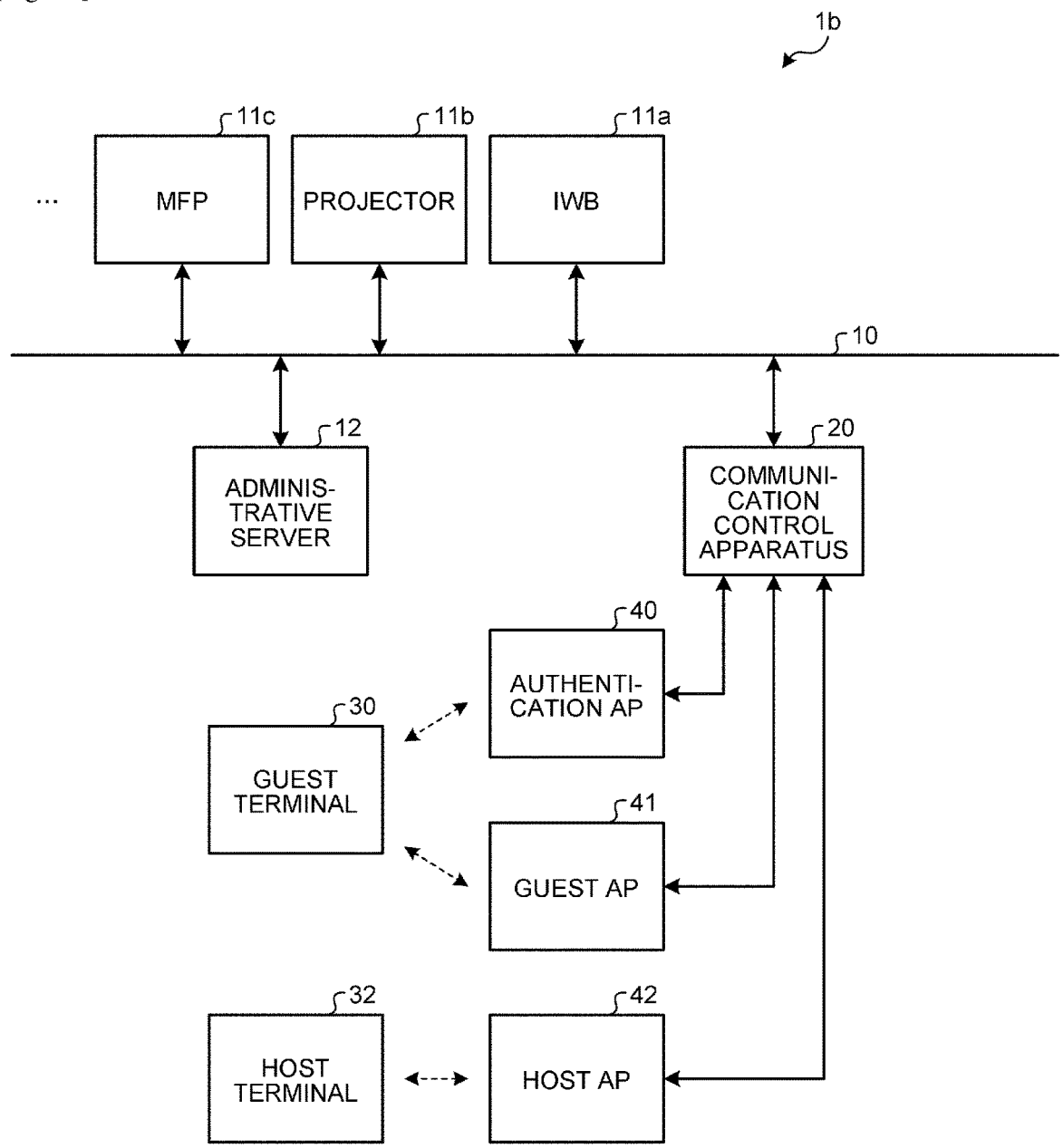

[Fig. 15]
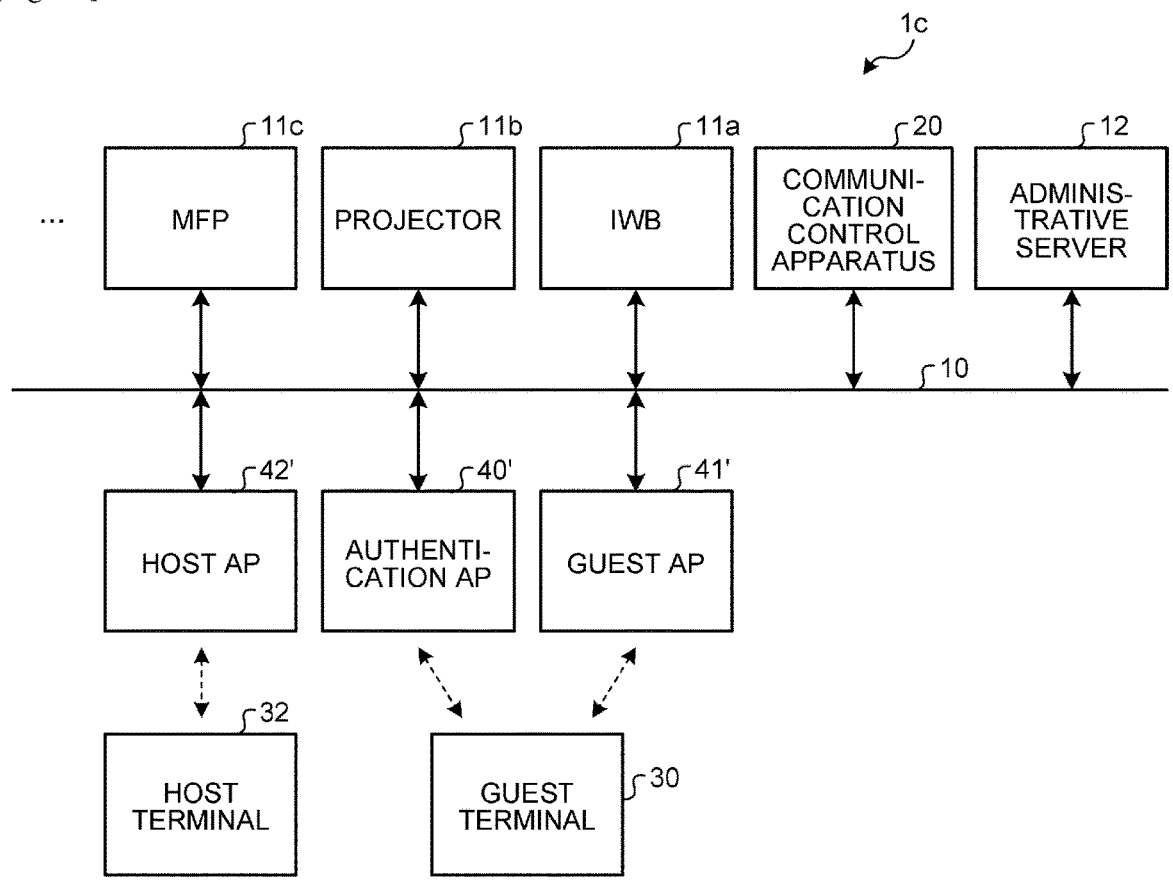

[Fig. 16]
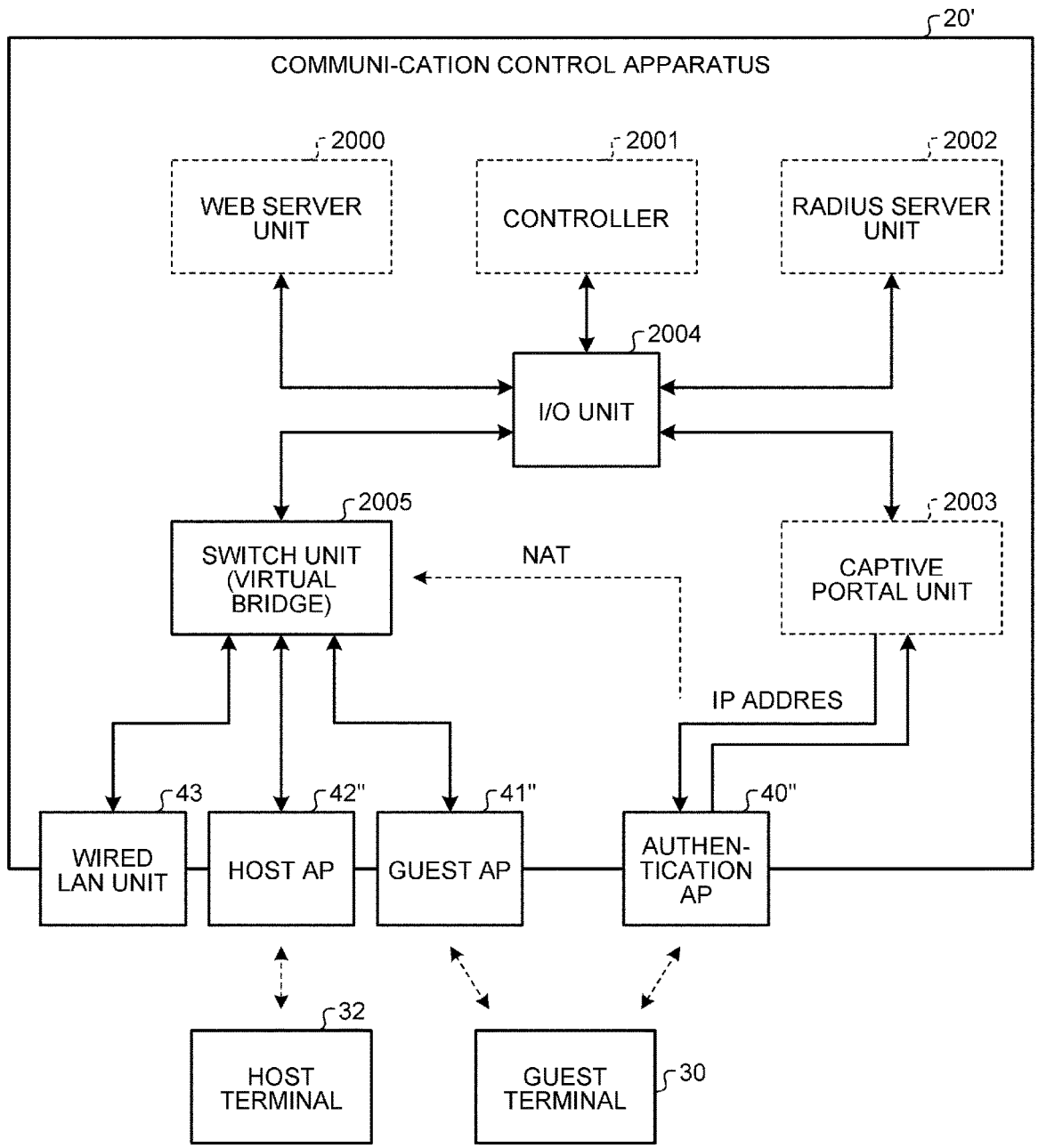

COMMUNICATION SYSTEM AND METHOD FOR MANAGING GUEST USER NETWORK CONNECTIONS

TECHNICAL FIELD

The present invention relates to communication systems, communication methods, and computer programs for managing guest user network connections

BACKGROUND ART

In recent years, it is a general practice that, with a local area network (LAN) built inside an organization such as a company, individual information devices used in the organization and individual devices such as a multifunction peripheral (MFP) and a projector apparatus are connected to one another via the LAN including a wireless LAN. Such a LAN built inside an organization is called an intra-organization LAN. In general, when an information device outside the organization is connected to an intra-organization LAN, an authentication process is performed at the time of connection of the information device, and various devices connected to the intra-organization LAN are made available from the information device if the authentication is successful.

Known techniques for facilitating an authentication process for connection to a wireless LAN include WI-FI Protected Setup (WPS) and AirStation One-Touch Secure System (AOSS (registered trademark)). In addition, Patent Literature 1 discloses a technique in which an access point establishes communication with the wireless terminal and transmit a setting program for performing security communication in a non-limited state, and then changes the status to a limiting state, thereby enabling easy setting of setting information on a wireless terminal.

SUMMARY OF INVENTION

Technical Problem

When an information device owned by a guest user outside an organization is connected to a LAN in the organization, it is sometimes desired that permission for connection to the information device of the guest user be flexibly controlled in accordance with an intention of a host user in the organization who directly deal with the guest user. However, typical techniques known to the inventor have an inconvenience because, although a guest user can easily be connected, a host user cannot easily control permission for connection.

For example, in order to control permission for connection, a host user has needed to perform an operation to change settings on an access point. For this reason, the operation may possibly be very troublesome when there are a large number of guest users for which whether to permit connection should be controlled individually.

The present invention has been made in view of the foregoing situations, and has an object to enable an information device of a user outside an organization to be easily connected to the internal network of the organization while maintaining the security.

Solution to Problem

A communication system includes a first communication unit, a second communication unit, an authentication unit, a connection guiding unit, a display unit, an input unit and a connection control unit. The first communication unit is configured to communicate with a terminal apparatus. The second communication unit is configured to communicate via a network. The authentication unit is configured to transmit an authentication screen for inputting authentication information, in response to access from the terminal apparatus. The connection guiding unit is configured to connect communication made from the terminal apparatus via the first communication unit and addressed to any destination, to the authentication unit. The display unit is configured to display the authentication information input to the authentication screen and output by the terminal apparatus that has been connected to the authentication unit by the connection guiding unit and to which the authentication screen has been transmitted. The input unit is configured to receive user input. The connection control unit is configured to permit connection of the terminal apparatus to the network via the second communication unit in accordance with the user input received by the input unit according to display by the display unit.

Advantageous Effects of Invention

The present invention has an effect that it is possible to easily connect an information processing device of a user outside an organization to the internal network of the organization while maintaining the security.

BRIEF DESCRIPTION OF DRAWINGS

FIG. 1 is a block diagram illustrating an exemplary configuration of a network system applicable to a first embodiment.

FIG. 2 is a block diagram illustrating an exemplary configuration of a communication control device applicable to the first embodiment.

FIG. 3 is an exemplary functional block diagram illustrating functions of the communication control apparatus according to the first embodiment.

FIG. 4 is a block diagram illustrating an exemplary configuration of a guest terminal applicable to the first embodiment.

FIG. 5 is an exemplary functional block diagram illustrating functions of the guest terminal according to the first embodiment.

FIG. 6 is an exemplary functional block diagram illustrating functions of a host terminal applicable to the first embodiment.

FIG. 7 is a view illustrating an example of a communication management screen according to the first embodiment to be used for setting the communication environment of the guest terminal from an administrative terminal.

FIG. 8 is a sequence diagram illustrating an example of a process for connecting the guest terminal to a network according to the first embodiment.

FIG. 9 is a view illustrating an example of a login screen that a host terminal uses to log in to the communication control apparatus.

FIG. 10 is a view illustrating an example of an available-device registration screen according to the first embodiment to be used for registering a device available from the guest terminal.

FIG. 11 is a view illustrating an example of the available-device registration screen according to the first embodiment that uses icon images.

FIG. 12 is a view illustrating an example of an authentication information input screen displayed on the guest terminal according to the first embodiment.

FIG. 13 is a view illustrating an example of an authentication screen displayed on the host terminal according to the first embodiment.

FIG. 14 is a block diagram illustrating an exemplary configuration of a network system according to a first modification of the first embodiment.

FIG. 15 is a block diagram illustrating an exemplary configuration of a network system according to a second modification of the first embodiment.

FIG. 16 is an exemplary functional block diagram illustrating functions of a communication control apparatus according to a second embodiment.

DESCRIPTION OF EMBODIMENTS

The following describes embodiments of a communication system, a communication method, and a computer program in detail with reference to the accompanying drawings.

First Embodiment

FIG. 1 illustrates an exemplary configuration of a network system applicable to a first embodiment. In FIG. 1, a network system 1a includes information devices 11a, 11b, 11c, . . . , an administrative server 12, a communication control apparatus 20, and a host terminal 32. The information devices 11a, 11b, 11c, . . . , the communication control apparatus 20, and the host terminal 32 are connected to a network 10 so as to be communicable with one another. In addition, an authentication access point (AP) 40 and a guest AP 41 are connected to the communication control apparatus 20. The authentication AP 40 and the guest AP 41 are separately accessed by a guest terminal 30 by wireless communication.

The network 10 is, for example, a network system with which communication is made with Transmission Control Protocol/Internet Protocol (TCP/IP) used as a protocol, and is an intra-organization LAN built exclusively within an organization such as a company. The administrative server 12 manages information on users permitted to be connected to the network 10, and information on the respective information devices 11a, 11b, 11c, . . . connected to the network 10. The user information managed by the administrative server 12 includes at least user names and passwords. A user whose user information is registered in the administrative server 12 is called a host user hereinafter. The device information managed by the administrative server 12 includes at least names given to the devices, the IP addresses of the devices on the network 10, and information indicating the kinds of the devices.

In the example in FIG. 1, the information devices 11a, 11b, and 11c are an interactive whiteboard (IWB), a projector, and a multi-function printer (MFP), respectively. Information devices to be connected to the network 10 are not limited to those devices, namely, the IWB, the projector, and the MFP.

The authentication AP 40 and the guest AP 41 are access points in a wireless LAN based on, for example, the IEEE (Institute of Electrical and Electronics Engineers) 802.11 standard. Hereinafter, a wireless LAN based on this IEEE 802.11 standard is called WI-FI, which is a name indicating that mutual connectivity is certified by the WI-FI Alliance, which is an industry group concerned with IEEE 802.11 devices.

Here, the authentication AP 40 is an access point to which devices are permitted to connect without any authentication process, such as sending of an encryption key, performed in connection via WI-FI. On the other hand, the guest AP 41 is an access point to which only terminal apparatuses authenticated through an authentication process are permitted to connect via WI-FI. For example, the guest AP 41 performs communication of information encrypted in accordance with an encryption scheme under Wi-Fi Protected Access (WPA (registered trademark)) 2 Personal, which is recommended by the WI-FI.

The guest terminal 30 cannot communicate with the network 10 through communication via the authentication AP 40. The guest terminal 30 can communicate with the network 10 through communication via the guest AP 41. That is, the authentication AP 40 and the guest AP 41 are a first communication unit and a second communication unit, respectively, which are used by the guest terminal 30 to make communication.

The host terminal 32 is a terminal apparatus that a host user uses, and the guest terminal 30 is a terminal apparatus that a user (called a guest user hereinafter) outside the organization uses. The communication control apparatus 20 controls connection of the guest terminal 30 to the network 10.

With this configuration, the guest terminal 30, when attempting to communicate with the network 10, first communicates with the network system 1a via the authentication AP 40 to go through an authentication process. Only after authentication through this authentication process is successful, the guest terminal 30 can communicate with the network 10 through communication via the guest AP 41.

More specifically, the guest terminal 30 first connects to the authentication AP 40 to communicate with the communication control apparatus 20 via the authentication AP 40. In response to this communication, the communication control apparatus 20 transmits an authentication screen for inputting authentication information, to the guest terminal 30. On the guest terminal 30, a guest user who operates the guest terminal 30 inputs certain authentication information to the authentication screen to transmit the input authentication information to the communication control apparatus 20 via the authentication AP 40.

The communication control apparatus 20 transmits the authentication information transmitted from the guest terminal 30, to the host terminal 32. The host terminal 32 causes a display device to display the authentication information transmitted from the communication control apparatus 20. A host user who uses the host terminal 32 sees the authentication information thus displayed, and performs an operation on the host terminal 32 to determine whether to authenticate the guest terminal 30. In response to this operation, the host terminal 32 transmits the authentication result to the communication control apparatus 20. In response to the authentication result, the communication control apparatus 20 renders connection information for connecting to the guest AP 41 acquirable from the guest terminal 30.

The guest terminal 30 acquires the connection information from the communication control apparatus 20, is thus enabled to communicate with the guest AP 41, and is thereby enabled to communicate with the network 10 via the guest AP 41. For example, the guest terminal 30 is enabled to communicate with the individual information devices 11a, 11b, 11c, and so on via the network 10 and thereby cause the individual information devices 11a, 11b, 11c, and so on to execute image display and printing.

(More Specific Configuration According to the First Embodiment)

FIG. 2 illustrates an exemplary configuration of the communication control apparatus 20 applicable to the first embodiment. In FIG. 2, the communication control apparatus 20 includes a central processing unit (CPU) 201, a read only memory (ROM) 202, a random access memory (RAM) 203, a storage 204, a communication interface (I/F) 205, and a data I/F 206. These individual components are connected to one another via a bus 200 so as to be communicable with one another. The storage 204 is a storage medium capable of storing therein information in a non-volatile manner, and can be implemented by use of a hard disk drive or a non-volatile semiconductor memory (such as a flash memory).

The CPU 201 controls the entire operation of the communication control apparatus 20 with the RAM 203 used as a working memory in accordance with computer programs previously stored in the storage 204 and the ROM 202. The communication I/F 205 controls communication with the network 10 in accordance with instructions from the CPU 201. The data I/F 206 is an interface for transmitting data to and receiving data from other devices, and, for example, a universal serial bus (USB) can be applied to implement the data I/F 206. The data I/F 206 is not limited to being thus implemented, and can be implemented using, as the data I/F 206, an interface such as Bluetooth (registered trademark) that performs data transmission and reception through wireless communication covering relatively short distances.

The communication control apparatus 20 can be thus configured with a general computer. Obviously, the communication control apparatus 20 may further include an input device that receives user input, and a display device that presents information to a user. Furthermore, the communication control apparatus 20 is not limited to being configured with only one computer, and may be configured with a plurality of computers operated in a distributed manner.

The authentication AP 40 and the guest AP 41 are connected to, for example, the data I/F 206. In one example, the authentication AP 40 and the guest AP 41 can be configured as a USB dongle and connected to the data I/F 206. In this case, the authentication AP 40 and the guest AP 41 may be configured as independent pieces of hardware or be configured as shared hardware. When the authentication AP 40 and the guest AP 41 are configured as shared hardware, switching between functions of the authentication AP 40 and the guest AP 41 can be implemented by a computer program that runs on the CPU 201. Alternatively, the authentication AP 40 and the guest AP 41 may be individually connected to the communication I/F 205.

FIG. 3 is an exemplary functional block diagram illustrating functions of the communication control apparatus 20 according to the first embodiment. In FIG. 3, the communication control apparatus 20 includes an overall control unit 211, a connection guiding unit 212, an authentication/connection control unit 213, and a communication control unit 214. These overall control unit 211, connection guiding unit 212, authentication/connection control unit 213, and communication control unit 214 are constructed from computer programs that run on the CPU 201. The overall control unit 211, the connection guiding unit 212, the authentication/connection control unit 213, and the communication control unit 214 are not limited to being thus constructed, and may be partly or entirely constructed from pieces of hardware that operate in cooperation with one another.

The overall control unit 211 collectively controls functions of the communication control apparatus 20. The connection guiding unit 212 forcibly guides a communication addressed to any destination (Uniform Resource Locator (URL)), toward a particular destination. Here, examples of the desired destination include destinations corresponding to the information devices 11a, 11b, 11c, and so on that are on the network 10. Regarding the connection guiding unit 212, a known technique called Captive Portal can be applied. Captive Portal is a technique that forces a Hypertext Transfer Protocol (HTTP) client to refer to a particular website on a network when using the network.

In addition, the connection guiding unit 212 has the dynamic host configuration protocol (DHCP) function and can assign an IP address to a target device or the like in response to a request.

The communication control unit 214 controls communication performed by the communication I/F 205. The authentication/connection control unit 213 has the function of a connection control unit that controls the communication route among the communication control unit 214, the authentication AP 40 and the guest AP 41. In addition, the authentication/connection control unit 213 has the function of an authentication unit that controls an authentication process executed via the authentication AP 40.

These overall control unit 211, connection guiding unit 212, authentication/connection control unit 213, and communication control unit 214 are implemented by, for example, an authentication control program that is stored on the storage 204 and runs on the CPU 201. This authentication control program is recorded, as a file in an installable or executable format, in a computer-readable recording medium such as a compact disc (CD), a flexible disk (FD), or a digital versatile disc (DVD) and provided.

Alternatively, the authentication control program to be executed by the communication control apparatus 20 in the first embodiment may be configured to be stored on a computer connected to a network such as the Internet, downloaded via the network and provided. Alternatively, a computer program to be executed by the communication control apparatus 20 in the first embodiment may be configured to be provided or distributed via a network such as the Internet. Further alternatively, the authentication control program in the first embodiment may be configured to be embedded previously in the ROM 202 or the like and provided.

The authentication control program to be executed by the communication control apparatus 20 in the first embodiment is configured in modules including the above-described units (the overall control unit 211, the connection guiding unit 212, the authentication/connection control unit 213, and the communication control unit 214). Actual hardware is built such that: the CPU 201 reads out the authentication control program from a storage medium such as the storage 204 or the ROM 202 and executes the program to load the above-described units onto a main storage unit such as the RAM 203; and the overall control unit 211, the connection guiding unit 212, the authentication/connection control unit 213, and the communication control unit 214 can be generated on the main storage unit.

FIG. 4 illustrates an exemplary configuration of the guest terminal 30 applicable to the first embodiment. The guest terminal 30 is constructed from, for example, a general computer and includes a CPU 301, a ROM 302, a RAM 303, a display device 304, a storage 305, an input device 306, a data I/F 307, and a communication I/F 308 with these units connected via a bus 300 so as to be communicable with one another. The storage 305 is a storage medium that is capable of storing information in a non-volatile manner, and the examples of which include a hard disk drive and a flash memory. The CPU 301 controls the entire operation of the guest terminal 30 while using the RAM 303 as a working memory, in accordance with a computer program previously stored in the storage 305 or the ROM 302.

The display device 304 includes, for example, display elements associated with a liquid crystal display (LCD), and a drive unit that drives the display elements in accordance with display control signals generated by the CPU 301. For example, the input device 306 is a touch panel formed integrally with the display device 304 and includes: an input element that outputs a signal corresponding to a position touched by a finger of a hand or the like; and an input control unit that converts the signal input from the input element into information interpretable to the CPU 301. The input device 306 is not limited to being a touch panel, and may be constructed with a pointing device, such as a mouse, and a keyboard.

The data I/F 307 is an interface for transmitting data to and receiving data from external devices, and, for example, a USB, Bluetooth (registered trademark), or the like is applicable. The communication I/F 308 controls WI-FI-based wireless communication in accordance with instructions of the CPU 301.

The host terminal 32 can be implemented in a configuration similar to the guest terminal 30, and a description thereof is omitted here.

FIG. 5 is an exemplary functional block diagram illustrating functions of the guest terminal 30 according to the first embodiment. In FIG. 5, the guest terminal 30 includes an input unit 311, a display unit 312, an overall control unit 313, and a communication control unit 314. These input unit 311, display unit 312, overall control unit 313, and communication control unit 314 are constructed from computer programs that run on the CPU 301.

The input unit 311 receives input given to the input device 306 and performs processing according to a position specified by the input. The display unit 312 generates display control information for displaying on the display device 304. The communication control unit 314 controls the communication I/F 308 to make communication related to authentication of the guest terminal. The overall control unit 313 collectively controls functions of the guest terminal 30.

Here, the guest terminal 30 includes, for example, a browser application (hereinafter called a browser) that is used for browsing information on a network. The input unit 311, the display unit 312, and the communication control unit 314 are, for example, functions implemented on this browser. In one example, the browser can implement functions of these input unit 311, display unit 312, and communication control unit 314 in accordance with a computer program provided from a server accessed by the guest terminal 30 via the network. The overall control unit 313 is a function implemented on an operating system (OS), which is a computer program that controls the entire operation of the guest terminal 30.

The input unit 311, the display unit 312, the overall control unit 313, and the communication control unit 314 are not limited to being thus constructed, and may be constructed from application programs installed in the guest terminal 30 or be constructed from pieces of hardware that operate in cooperation with one another.

FIG. 6 is an exemplary functional block diagram illustrating functions of the host terminal 32 applicable to the first embodiment. In FIG. 6, the host terminal 32 includes an input unit 321, a display unit 322, and an overall control unit 323. These input unit 321, display unit 322, and overall control unit 323 are constructed from a computer program that runs on a CPU included in the host terminal 32.

As in the case of the guest terminal 30 described above, the host terminal 32 includes a browser, and functions of the input unit 321 and the display unit 322 are implemented on the browser. The functions of these input unit 321 and display unit 322 are the same as the functions of the input unit 311 and the display unit 312 in the guest terminal 30, and the detailed description thereof is omitted here. The function of the overall control unit 323 is a function implemented on an OS installed in the host terminal 32. The function of the overall control unit 323 is also the same as the functions of the overall control unit 313 in the guest terminal 30 described above, and the detailed description thereof is omitted here.

The input unit 321, the display unit 322, the overall control unit 323 are not limited to being thus constructed, and may be constructed from an application program installed in the host terminal 32 or be constructed from pieces of hardware that operate in cooperation with one another.

(Authentication Process According to the First Embodiment)

Next, an example of an authentication process according to the first embodiment applied to the guest terminal 30 is described in further detail. The communication environment of the guest terminal 30 is set before performing the authentication process to the guest terminal 30. For example, a system administrator of the network system 1a sets the communication environment of the guest terminal 30 from an administrative terminal connected to the network 10 using a communication management screen that is used for setting the communication environment of the guest terminal 30. FIG. 7 illustrates an example of the communication management screen.

In FIG. 7, a communication management screen 420 contains regions 421, 422, and 423, a Set button 424, and a cancel button 425. In the region 421, an input section 4210 is contained, and setting and display regarding wireless communication for the guest terminal 30 are implemented. In the region 421, a wireless LAN and near field wireless communication have been made available. These settings are set in advance separately.

In the region 421, the input section 4210 is used to specify whether to randomly set settings for a wireless LAN for the guest terminal 30. Using the input section 4210 to specify that the settings are randomly set, the communication control apparatus 20 can, each time the guest terminal 30 connects to the guest AP 41, randomly generate the file name of a connection setting file that is used at the time of connection to the guest AP 41, for example. The security of communication via the guest AP 41 can be thus enhanced. Alternatively, a password to be used in connecting to the guest AP 41 may be randomly generated each time the guest terminal 30 connects.

In the region 422, input sections 4221 to 4223 are contained, and fixed connection information on the guest AP 41 are set. The input section 4221 sets a service set identifier (SSID) for the guest AP 41. The input section 4222 is used to specify an authentication scheme and an encryption scheme to be applied to the guest AP 41 to implement security settings. The input section 4223 sets a pre-shared key (PSK) that is an encryption key for the guest AP 41.

In the region 423, input sections 4231 to 4236 are contained, and administrative privilege are set. The input section 4231 sets whether to permit the guest terminal 30 to connect to the network 10 via a wireless LAN.

The input section 4232 is used to specify a user to whom the authority to grant permission is given for access by the guest terminal 30 using WI-FI Protected Setup (WPS (registered trademark)) or Captive Portal. For example, the input section 4232 is used to specify an "inviter", thereby specifying a host user who has invited a guest user to the network system 1a as the user to whom the authority to grant the permission is given. In this case, specifically, the authority to grant the permission is given to a host user who has logged into the network system 1a from the host terminal 32.

With this input section 4232, one of a plurality of access levels can be selected for a user to whom the authority to grant permission for access by the guest terminal 30 is given. In one example, a first access level is defined to represent a level (an "inviter" in the example in FIG. 7) of access authority for temporarily permitting a guest user to use the individual information devices 11a, 11b, 11c, and so on. In addition, a second access level higher than the first access level is defined to represent a level (for example, an "operator") of access authority for permitting changing settings of the network 10, settings of a wireless LAN using the guest AP 41, and the like. With the input section 4232, either of these options of an "inviter" and an "operator" is selected as a user to whom the authority to grant permission for access by the guest terminal 30.

The input section 4233 sets whether to permit the guest terminal 30 to go through a simplified setup process to the network 10 via near-field wireless communication.

The input section 4234 sets the upper limit of a connection time from the start of connection of the guest terminal 30 to the guest AP 41. The input section 4235 sets whether to terminate connection of the guest terminal 30 to the network 10 based on time. For example, when the input section 4235 sets "YES", the network system 1a terminates connection of the guest terminal 30 to the network 10 when a connection time from the start of the connection of the guest terminal 30 to the guest AP 41 reaches the upper limit set by the input section 4234.

The input section 4236 sets whether a user to register a device available to the guest terminal 30 connected to the network 10 is to be restricted to an administrator of the network system 1a. When "NO" is specified in the input section 4236, a host user who has logged into the network system 1a from the host terminal 32 is also enabled to register the available device.

The set button 424 is for setting the specific settings made on the communication management screen 420 as described above on the network system 1a. For example, in response to an operation on the set button 424, an administrative terminal registers the specific settings made on the communication management screen 420 in the administrative server 12. The cancel button 425 is for cancelling the specific settings made on the communication management screen 420 and closing this communication management screen 420.

Next, an example of a process according to the first embodiment for connection of the guest terminal 30 to the network 10 is described in further detail by use of a sequence diagram in FIG. 8. The same components as in FIG. 1 and FIG. 3 described above are assigned the same reference signs in FIG. 8, and the detailed description thereof is omitted. In FIG. 8, a wireless LAN control module 215 is a function included in the communication control apparatus 20 and controls operation of the authentication AP 40 and the guest AP 41. The wireless LAN control module 215 is implemented by a computer program that runs on the CPU 201 in the communication control apparatus 20.

Before the start of the process according to the sequence diagram in FIG. 8, a host user notifies, using some sort of method, a guest user of authentication information to be used for the host user to authenticate the guest user. In the first embodiment, the host user directly notifies identification information to the guest user. A method for notification of the identification information is not limited, and may be a verbal communication or a note. An electronic mail or the like may be used for notification of the identification information. It is preferable that notification of the identification information be made each time the guest terminal 30 connects to the network 10.

It is assumed that the host terminal 32 has been connected to the network 10 in advance.

In step S100, the host terminal 32 logs into the communication control apparatus 20 in accordance with an operation of the host user. For example, the host terminal 32 accesses the communication control apparatus 20 in accordance with an operation of the host user. The communication control apparatus 20 transmits a login screen to be used for logging into the communication control apparatus 20, to the host terminal 32. FIG. 9 illustrates an example of the login screen. In FIG. 9, this login screen 400 includes: input sections 401 and 402 to be used for inputting a user name and a password, respectively; a Login button 403 to be used for requesting a login to the communication control apparatus 20; and a cancel button 404 that is for canceling a login process.

The host terminal 32 causes the display unit 322 to display the login screen 400 transmitted from the communication control apparatus 20, on a display device. The host user inputs a user name and a password in accordance with the login screen 400 displayed on the host terminal 32, and operates the Login button 403. In response to this operation of the Login button 403, the host terminal 32 transmits the input user name and password as authentication information to the communication control apparatus 20. The communication control apparatus 20 performs an authentication process on the authentication information transmitted from the host terminal 32.

For example, the communication control apparatus 20 sends the authentication information transmitted from the host terminal 32, to the administrative server 12. The administrative server 12 determines whether authentication information that is identical to the authentication information sent from the communication control apparatus 20 is registered. If determining that such authentication information is registered, the administrative server 12 notifies the communication control apparatus 20 that the authentication is successful.

At this time, the administrative server 12 can confirm, based on the authentication information sent from the communication control apparatus 20, whether the authority of the user corresponding to the authentication information corresponds to an access level selected in the input section 4232 in FIG. 7. For example, if confirming that the authority of the user for the authentication information corresponds to an access level selected in the input section 4232 in FIG. 7, the administrative server 12 determines that the authentication is successful.

Upon receiving a notification from the administrative server 12 that the authentication is successful, the communication control apparatus 20 transmits a host screen to the host terminal 32 at step S101. The host screen includes an available-device registration screen to be used for registering an information device to be made available to the guest terminal 30. The communication control apparatus 20 transmits not only the host screen but also information for making various settings and the registration through the host screen, to host terminal 32.

In one example, the communication control apparatus 20 transmits not only the host screen but also various pieces of information that are previously stored in the storage 204 and are to be used for setting a communication environment through the communication management screen, to the host terminal 32. Furthermore, the communication control apparatus 20 acquires a list of information devices that is used for selecting an information device through the available-device registration screen, from the administrative server 12, and transmits the acquired list of information devices in addition to the host screen to the host terminal 32.

The host terminal 32 causes the display unit 322 to display the host screen transmitted from the communication control apparatus 20 on a display device at step S101. The host terminal 32 transmits setting information and registration information that are input in accordance with the host screen, to the communication control apparatus 20 at step S102 (step S103).

FIG. 10 illustrates an example of an available-device registration screen 410 that is contained in a host screen according to the first embodiment and is used for registering a device available from the guest terminal 30. For example, when "NO" is specified in the input section 4236 on the communication management screen 420 in FIG. 7 described above, this available-device registration screen 410 is displayed on the host terminal 32. The available-device registration screen 410 contains: a button group 411 including selection buttons 411a to 411c and a delete button 411d; input sections 412 and 413; and a registration button 414.

The selection buttons 411a to 411c are, for example, buttons to be used for selecting an available device based on a name, an IP address, and a kind of device of the information device, respectively. For example, with the selection buttons 411a and 411b, selection is made based on the name and the IP address, respectively, and one information device is selected at one time. On the other hand, with the selection button 411c, selection is made based on the kind of information device, and a plurality of information devices belonging to the same kind can be selected at one time.

In one example, with the selection button 411a operated, the host terminal 32 displays, in the form of a drop-down list, a list of the names of the respective information devices contained in an information device list. Based on this display of the list, the host user operates the host terminal 32 to select the name of any information device desired to be made available. The name of the selected information device is set into a selected state. A plurality of names of information devices can be selected.

When the registration button 414 is operated, the host terminal 32 transmits selected-device information indicating an information device or information devices set into the selected state or states on the available-device registration screen 410, to the communication control apparatus 20. In the communication control apparatus 20, the authentication/connection control unit 213 sets transfer control information for the guest AP 41 in accordance with the selected-device information transmitted from the host terminal 32.

Although the foregoing describes displaying of device information of information devices in the form of a list, the method is not limited to this example. For example, with icon images indicating information devices displayed on the available-device registration screen 410, a corresponding one of these icon images may be specified to select an information device desired to be made available.

FIG. 11 illustrates an example of an available-device registration screen 410' according to the first embodiment that employs icon images. In the example in FIG. 11, in the available-device registration screen 410', the information devices 11a, 11b, and 11c that can be permitted to be used are displayed in the forms of icon images 11a', 11b', and 11c'.

After a desired icon image is selected from among the icon images 11a', 11b', and 11c', the host terminal 32 transmits device information on an information device corresponding to the selected icon image to the communication control apparatus 20 when a registration button 414' is operated. In addition, a plurality of icon images can be selected from among the icon images 11a', 11b', and 11c' on the available-device registration screen 410', and the host terminal 32 may transmit device information on a plurality of information devices to the communication control apparatus 20.

Subsequently, in response to an operation performed on the host terminal 32, the host terminal 32 transmits a request for activation of the authentication AP 40 to the communication control apparatus 20 (step S104). In response to this request for activation, the communication control apparatus 20 instructs the wireless LAN control module 215 to activate the authentication AP 40 (step S105). The wireless LAN control module 215 activates the authentication AP 40 in response to this activation instruction (step S106).

After transmitting the request for activation of the authentication AP 40, the host terminal 32 requests the authentication/connection control unit 213 to provide an authentication screen to be used for authenticating the guest terminal 30 (step S120). In response to this request, an authentication screen is transmitted to the host terminal 32 from the authentication/connection control unit 213 (step S121). The host terminal 32 receives this authentication screen and causes the display unit 322 to display the authentication screen on the display device. A specific example of the authentication screen is described later.

After the activating of the authentication AP 40, the guest terminal 30 connects to the authentication AP 40 via wireless communication using WI-FI (step S107). Here, the host user has notified the guest user of an SSID for the authentication AP 40 in advance. There is no need for the authentication AP 40 to perform encryption using a wired equivalent privacy (WEP) key.

For example, the guest user operates the guest terminal 30 to select the authentication AP 40 from connectable devices; then inputs the SSID for the authentication AP 40 that the guest terminal 30 has been notified of, to a login screen for the authentication AP 40 displayed on the guest terminal 30; and then transmits the input SSID to the authentication AP 40. In this manner, an authentication process is performed between the guest terminal 30 and the authentication AP 40, so that connection between the guest terminal 30 and the authentication AP 40 is established.

When connection to the authentication AP 40 is established, the guest terminal 30 transmits an IP address request, thereby requesting an IP address of the guest terminal 30 on the network 10. This IP address request is received by the connection guiding unit 212 in the communication control apparatus 20 via the authentication AP 40 (step S108 and step S109). The connection guiding unit 212 generates an IP address in response to this IP address request, and provides the generated IP address to the guest terminal 30 (step S110 and step S111). The guest terminal 30 stores therein the IP address provided from the communication control apparatus 20 as an IP address of the guest terminal 30.

Subsequently, for example, in response to being operated by the guest user, the guest terminal 30 executes access to any URL using the hypertext transfer protocol (HTTP) (step S130). An access request to the desired URL transmitted from the guest terminal 30 is received by the communication control apparatus 20 and acquired by the connection guiding unit 212. The connection guiding unit 212 sends the acquired access request to the authentication/connection control unit 213, thereby forcibly guiding the access from the guest terminal 30 to the authentication/connection control unit 213 (step S132).

In response to the access request guided and sent from the connection guiding unit 212, the authentication/connection control unit 213 transmits an authentication information input screen to the guest terminal 30. The authentication information input screen transmitted from the authentication/connection control unit 213 is received by the guest terminal 30 via the authentication AP 40 (step S133, step S134).

The guest terminal 30 causes the display unit 312 to display the authentication information input screen transmitted from the authentication/connection control unit 213 on the display device 304. The guest user operates the guest terminal 30 to input authentication information to this authentication information input screen (step S135). The authentication information input by the guest user here is the authentication information that the host user has notified of in advance of the process according to the foregoing sequence diagram in FIG. 8.

FIG. 12 illustrates an example of an authentication information input screen displayed on the display device 304 of the guest terminal 30 according to the first embodiment. In FIG. 12, the authentication information input screen 430 includes an information display region 4301 and an input region 4302. In the information display region 4301, the current status of the guest terminal 30 in the present network system 1a and information indicating a current process related to this authentication information input screen 430, for example, are displayed.

The input region 4302 contains, for example, a drawing region 4310, a transmission button 4311, and a clearing button 4312. In the drawing region 4310, drawing is performed in accordance with operation on the input device 306 of the guest terminal 30. The guest user performs drawing in the drawing region 4310 based on authentication information that the host user has notified of in advance. The content of the drawing is not limited as long as the guest user and the host user can share the recognition of what the content is, and may be a picture, a character(s), or a sign(s). In response to the operation of the transmission button 4311, authentication information (authentication image) drawn in the drawing region 4310, for example, is transmitted from the guest terminal 30 (step S136).

A drawn content in the drawing region 4310 can be erased by operating the clearing button 4312 on the authentication information input screen 430. The drawing region 4310 is not limited to an input method in which authentication information is input by drawing, and, for example, the authentication information may be input in the form of a character string.

The authentication information (authentication image) transmitted from the guest terminal 30 is received by the authentication/connection control unit 213 via the authentication AP 40 (step S137). The authentication/connection control unit 213 transmits the received authentication information to the host terminal 32 (step S138). The host terminal 32 displays the received authentication information on the authentication screen received from the authentication/connection control unit 213 at step S121 (step S139).

FIG. 13 illustrates an example of an authentication screen displayed on the host terminal 32 according to the first embodiment. In FIG. 13, the authentication screen 440 includes an information display region 4401 and an authentication region 4402. In the information display region 4401, information on settings for access of the guest terminal 30 to the network 10, for example, is displayed.

The authentication region 4402 includes a terminal information display section 4405, an authentication information display section 4406, an authentication button 4407, and a connection information display section 4408. In the terminal information display section 4405, information (such as an IP address) on the guest terminal 30 subject to authentication is displayed. In the authentication information display section 4406, authentication information (authentication image) transmitted from the guest terminal 30 is displayed. The authentication button 4407 is a button to be used for authenticating the guest terminal 30 subject to authentication. The connection information display section 4408 indicates the connection status of the guest terminal 30.

For example, when the host user operates the authentication button 4407 in response to the authentication information (authentication image) displayed on the authentication information display section 4406, the host terminal 32 transmits an authentication OK notification indicating that the guest terminal 30 has been authenticated, to the authentication/connection control unit 213 (step S140). Upon receiving the authentication OK notification from the host terminal 32, the authentication/connection control unit 213 generates a connection information file containing connection information to be used by the guest terminal 30 to connect to the guest AP 41.

The authentication/connection control unit 213 produces an SSID for the guest AP 41 and a connection information file containing an encryption key (PSK), and then randomly generates the file name of this connection information file, for example. The authentication/connection control unit 213 transmits a URL containing this randomly generated file name and indicating the location of the connection information file on the network 10 to the guest terminal 30 via the authentication AP 40 (step S141 and step S142).

In response to receiving the URL transmitted from the authentication/connection control unit 213, the guest terminal 30 requests in accordance with the received URL, via the authentication AP 40, the authentication/connection control unit 213 to provide a connection information file to be used for connecting to the guest AP 41 (step S150, step S151). In response to this request, the authentication/connection control unit 213 transmits the connection information file to the guest terminal 30 via the authentication AP 40, thereby providing the connection information file to the guest terminal 30 (step S152 and step S153). The guest terminal 30 installs the connection information file transmitted from the authentication/connection control unit 213, in the guest terminal 30 itself to set connection information (step S154).

When an instruction to terminate the authentication AP 40 is provided through further operation on the host terminal 32 by the host user after the authentication button 4407 is operated at step S140 described above, the host terminal 32 transmits a request to terminate the authentication AP 40 to the authentication/connection control unit 213 (step S160). In response to this termination request, the authentication/connection control unit 213 instructs the wireless LAN control module 215 to terminate the authentication AP 40 (step S161). In response to this termination instruction, the wireless LAN control module 215 terminates the operation of the authentication AP 40 (step S162).

In response to termination of the operation of authentication AP 40, the guest terminal 30 recognizes that connection to the authentication AP 40 has been disconnected, thereby acknowledging that the authentication AP 40 has been terminated (step S163). After acknowledging that the authentication AP 40 has been terminated, the guest terminal 30 connects to the guest AP 41 in accordance with the connection information set at step S154 (step S170). In this manner, the guest terminal 30 is enabled to access the network 10.

In the first embodiment, access to any destination from the guest terminal 30 is forcibly guided to the authentication/connection control unit 213, and an authentication information input screen is transmitted to the guest terminal 30 from the authentication/connection control unit 213. Subsequently, the host user determines whether to permit connection of the guest terminal 30 to the network 10, based on the authentication information that the guest user has been notified of in advance and has input to the authentication information input screen. Consequently, the guest terminal 30 can be easily connected to the network 10. In addition, malicious entry to the network 10 from outside an organization can be prevented. Furthermore, in the first embodiment, the host user determines whether to permit the guest terminal 30 to connect to the network 10, and it is thus made possible to control, without changing settings of the access point and/or the like, whether to permit the connection of the guest terminal 30.

(First Modification of the First Embodiment)

A first modification of the first embodiment is described next. FIG. 14 illustrates an exemplary configuration of a network system according to the first modification of the first embodiment. The same components as in FIG. 1 described above are assigned the same reference signs in FIG. 14, and the detailed description thereof is omitted.

In FIG. 14, in a network system 1b according to the first modification of the first embodiment, the host terminal 32 is connected to the communication control apparatus 20 via a host AP 42 by use of a wireless LAN. The host AP 42 is connected further to the authentication/connection control unit 213 in the communication control apparatus 20. The host terminal 32 performs communication with the host AP 42 in accordance with an encryption scheme specified in, for example, WPA2 Personal. A process for connection of the guest terminal 30 to the network 10 is the same as the connection process according to the first embodiment described by use of FIG. 8, and the detailed description thereof is omitted here.

(Second Modification of the First Embodiment)

A second modification of the first embodiment is described next. FIG. 15 illustrates an exemplary configuration of a network system according to the second modification of the first embodiment. The same components as in FIG. 1 described above are assigned the same reference signs in FIG. 15, and the detailed description thereof is omitted.

In FIG. 15, in a network system 1c according to the second modification of the first embodiment, an authentication AP 40' and a guest AP 41' with which the guest terminal 30 communicates, and a host AP 42' with which the host terminal 32 communicates are connected to the network 10. In this case, in the same manner as in the foregoing first modification of the first embodiment, the host terminal 32 communicates with a host AP 42' in accordance with an encryption scheme specified in, for example, WPA2 Personal.

In addition, as in the case of the connection process according to the first embodiment described by use of FIG. 8, the guest terminal 30 performs an authentication process via the authentication AP 40 while being connected to the authentication AP 40' through communication in which encryption based on WPA2 Personal is not performed. Subsequently, after being successfully authenticated, the guest terminal 30 communicates with the network 10 via the guest AP 41' under an encryption scheme based on WPA2 Personal.

The first modification of the first embodiment and the second modification of the first embodiment are also configured such that: access to any destination from the guest terminal 30 may be forcibly guided to the authentication/connection control unit 213 to cause the guest terminal 30 to display the authentication information input screen; and the host user determines whether to authenticate the guest terminal 30 based on authentication information that the guest user has been notified in advance and has input to the authentication information input screen. Consequently, the guest terminal 30 can be easily connected to the network 10, while malicious entry to the network 10 from outside an organization can be prevented. Furthermore, in each of the individual modifications of the first embodiment, the host user determines whether to permit the guest terminal 30 to connect to the network 10, and it is thus made possible to control, without changing settings of the access point and/or the like, whether to permit the connection of the guest terminal 30.

Second Embodiment

A second embodiment is described next. Functions to be executed on the communication control apparatus 20 according to the first embodiment described above can be configured based on the concept of a software-defined network (SDN). Here, an SDN is schematically described.

It has been a general practice that a network environment of an intra-organization LAN or the like built exclusively within an organization is constructed by a dedicated person in charge who is knowledgeable about setting and operation of LAN switches and wireless LAN access points provided by various vendors. Such a network environment is constructed into what is called a "vendor lock-in state", in which no authentication mechanisms and operational procedures other than the authentication mechanism and the operational procedure based on solutions from a vendor are provided. In such a network environment, it has been therefore difficult for the organization to freely set an authentication mechanism and an operational procedure.

Regarding this inconvenience, as a way to enable an organization as a user to construct a unique network, the concept called an SDN has attracted attention in recent years, which enables exchange of data over a network to be controlled only with software. In connection with this SDN, the representative constituent technical elements that have attracted attention include "virtualization of a network" and "OpenFlow", which is one scheme (protocol) for controlling communication over a network thus virtualized and has open specifications that are independent of a vendor.

The network virtualization is a collection of techniques including a plurality of constituent elements including, for example, a virtual interface technique by which one physical interface is made to appear to be a plurality of interfaces (or a plurality of physical interfaces are made to appear to be one interface), and a virtual switch technique for relaying and connecting the virtual interface. The network virtualization virtually separates a logical network configuration from a physical network configuration using a combination of a physical network machine, a virtual network component, and a protocol technique, to implement a flexible network configuration free from the physical configuration.

OpenFlow treats communication as an end-to-end flow, and allows route control, load distribution, optimization in units of such flows. Specifically, OpenFlow is implemented by change to a centrally controlled system instead of analyzing and transferring data packets in a relay device and/or the like in an autonomous distributed manner.

OpenFlow separates a "data plane", which is a part that handles simply physically transferring packets, from a "control plane" that analyzes data, determines transfer destinations, and controls determination. In OpenFlow, an Open-Flow controller (OFC) that controls the control plane provides instructions on transfer rules, and an OpenFlow switch (OFS) that handles the data plane transfers packets in accordance with the instructions from the OFC. More specifically, the OFS transfers packets in accordance with a flow table to which OFC makes additions and changes and that is retained by the OFS. Using this mechanism enables Open-Flow to be utilized as a tool for controlling the foregoing network virtualization.

FIG. 16 is an exemplary functional block diagram illustrating functions of a communication control apparatus according to the second embodiment. In FIG. 16, a communication control apparatus 20' is an example of a case in which the communication control apparatus 20 according to the first embodiment is configured with the application of the concept of an SDN. The network system 1b according to the first modification of the first embodiment described above is applicable to the second embodiment. Alternatively, the network system 1a according to the first embodiment may be applied to the second embodiment.

In FIG. 16, the communication control apparatus 20' includes a Web server unit 2000, a controller 2001, a RADIUS server unit 2002, a captive portal unit 2003, an I/O unit 2004, and a switch unit 2005. These Web server unit 2000, controller 2001, RADIUS server unit 2002, captive portal unit 2003, I/O unit 2004, and switch unit 2005 are constructed from a computer program that runs on the CPU 201.

Further in FIG. 16, an authentication AP 40", a guest AP 41", and a host AP 42" are individual WI-FI compliant access points. These authentication AP 40", guest AP 41", and host AP 42" may be individually constructed from independent pieces of hardware or be virtually constructed from a computer program. In this case, for example, SSIDs for the authentication AP 40", the guest AP 41", and the host AP 42" are switched from one another for one access point in one wireless LAN by the CPU 201 in accordance with the computer program, in the communication control apparatus 20'. A wired LAN unit 43 controls communication between the communication control apparatus 20' and the network 10.

In FIG. 16, the authentication AP 40" and the guest AP 41" correspond to the authentication AP 40 and the guest AP 41 according to the first embodiment, respectively. That is, the authentication AP 40" communicates with the guest terminal 30 without encryption under such a scheme as WPA2 Personal, and the guest AP 41" communicates with the guest terminal 30 in accordance with an encryption scheme specified in, for example, WPA2 Personal. Further, in FIG. 16, the host AP 42" corresponds to the host AP 42 in the first modification of the first embodiment, and communicates with the host terminal 32 in accordance with an encryption scheme specified in WPA2 Personal.

In FIG. 16, the Web server unit 2000 can provide Web pages to the guest terminal 30 and the host terminal 32, for example, by communicating with the guest terminal 30 and the host terminal 32 via the guest AP 41" and the host AP 42", respectively, in compliance with the HTTP. The RADIUS server unit 2002 performs an authentication process, for example, on the host terminal 32 and the guest terminal 30.

In FIG. 16, the captive portal unit 2003 corresponds to the connection guiding unit 212 in the first embodiment and has a function of forcibly guiding a received packet to a particular destination and the DHCP function, for example. The Web server unit 2000, the controller 2001, and the RADIUS server unit 2002 are individually included in the authentication/connection control unit 213 in the first embodiment. Regarding the controller 2001, the functions of the foregoing OFC can be implemented, for example, by the controller 2001. The I/O unit 2004 controls the route of input data in accordance with, for example, information appended to the data and indicating the destination.

The guest AP 41", the host AP 42", and the wired LAN unit 43 are connected to the switch unit 2005. The switch unit 2005 corresponds to the foregoing OFS, and has a flow table and a function as a virtual bridge. A virtual bridge virtually implements, in the form of a computer program, a bridge that relays packets between the network 10 connected through the wired LAN unit 43 and a wireless LAN communication using the guest AP 41" and the host AP 42". The switch unit 2005 controls, for example, in accordance with transfer control information written into the flow table by the controller 2001, behavior of each packet that is relayed. The transfer control information contains conditions for a packet subject to the process and a transfer destination of this packet.

Next, an example of a process according to the second embodiment for connection of the guest terminal 30 to the network 10 is described with reference to the foregoing sequence diagram in FIG. 8. If authentication by the RADIUS server unit 2002 succeeds (step S100 to step S103 in FIG. 8), the host terminal 32 requests the controller 2001 to activate the authentication AP 40" (step S104 in FIG. 8). The controller 2001 activates the authentication AP 40 in response to this request (step S105 and step S106 in FIG. 8).

The host terminal 32 then requests the communication control apparatus 20' to provide an authentication screen (step S120 in FIG. 8). This authentication screen request is input to the switch unit 2005 via the host AP 42". In the switch unit 2005, transfer control information is written in the flow table by the controller 2001. The transfer control information enables packet transfer between the host terminal 32 and the Web server unit 2000 via the host AP 42". In accordance with this transfer control information, the switch unit 2005 sends the authentication screen request input from the host AP 42", to the Web server unit 2000 (step S121 in FIG. 8).

On the other hand, the guest terminal 30 connects to the authentication AP 40" thus activated (step S107 in FIG. 8)

and requests the communication control apparatus 20' to provide an IP address (step S108 and step S109 in FIG. 8). This IP address request is received by the captive portal unit 2003.

The captive portal unit 2003 issues an IP address in response to the received IP address request, and transmits the IP address to the guest terminal 30 via the authentication AP 40", thereby providing the IP address to the guest terminal 30 (step S110 and step S111 in FIG. 8).

When access from the guest terminal 30 to the communication control apparatus 20' using any URL based on the HTTP is executed at this point in time, an access request is sent to the captive portal unit 2003 from the authentication AP 40" (step S130 and step S131 in FIG. 8). The captive portal unit 2003 sends the sent access request to the Web server unit 2000 via the I/O unit 2004 (step S132 at FIG. 8). The Web server unit 2000 transmits an authentication information input screen, for example, as described by use of FIG. 12 to the guest terminal 30 in response to the sent access request (step S133 and step S134 in FIG. 8).

The guest terminal 30 transmits authentication information input in accordance with the authentication information input screen to the communication control apparatus 20' (step S136 in FIG. 8). The authentication information is received by the authentication AP 40", and sent to the Web server unit 2000 from the authentication AP 40" via the captive portal unit 2003 (step S137 in FIG. 8). The Web server unit 2000 input the sent authentication information to the switch unit 2005. In accordance with the transfer control information written into the flow table, the switch unit 2005 transmits the input authentication information to the host terminal 32 via the host AP 41" (step S138 in FIG. 8). The host terminal 32 receives the authentication information, and displays the received authentication information on the authentication screen already acquired (step S139 in FIG. 8).

The host terminal 32 transmits authentication OK information when authentication is made through operation by a user with respect to the authentication information displayed on the authentication screen (step S140 in FIG. 8). An authentication OK notification is sent to the switch unit 2005 from the host AP 42", and the authentication OK notification is sent by the switch unit 2005 to the Web server unit 2000 in accordance with the transfer control information written in the flow table. In response to the authentication OK notification, the Web server unit 2000 produces a connection information file containing, for example, an SSID for the guest AP 41" and an encryption key, and randomly generates a file name of this connection information file. The Web server unit 2000 transmits a URL indicating the position of the connection information file containing this randomly generated file name on the network 10, to the guest terminal 30 via the authentication AP 40" (step S141 and step S142).

In accordance with the URL transmitted from the communication control apparatus 20', the guest terminal 30 requests, via the authentication AP 40", the communication control apparatus 20' to provide the connection information file to be used for connecting to the guest AP 41" (step S150 in FIG. 8). This request is sent to the captive portal unit 2003, and then sent to the Web server unit 2000 from the captive portal unit 2003 (step S152 in FIG. 8). In response to this request, the Web server unit 2000 transmits the connection information file to the guest terminal 30 via the authentication AP 40" (step S152 and step S153 in FIG. 8). The connection information file is thus delivered to the guest terminal 30 from the communication control apparatus 20'. The guest terminal 30 installs the connection information file transmitted from the communication control apparatus 20', in the guest terminal 30 itself to set connection information (step S154 in FIG. 8).

When an instruction to terminate the authentication AP 40 is provided through operation on the host terminal 32 by the host user after the transmission of the authentication OK notification, the host terminal 32 transmits a request to terminate the authentication AP 40". This termination request is received by the authentication AP 40" via the Web server unit 2000, the I/O unit 2004, and the captive portal unit 2003, so that the authentication AP 40" stops functioning (step S160 to step S162 in FIG. 8).

After confirming that the authentication AP 40" has been terminated (step S163 in FIG. 8), the guest terminal 30 connects to the guest AP 41" in accordance with the connection information set at step S154 (step S170 in FIG. 8). Here, in the communication control apparatus 20', the transfer control information, which enables packet transfer between the guest terminal 30 and the network 10 via the guest AP 41" and the wired LAN unit 43, is written in the flow table of the switch unit 2005 in the controller 2001. The guest terminal 30 is thus enabled to access the network 10 via the communication control apparatus 20'.

In the second embodiment, it is preferable that at least communication related to the delivery of the connection information file (for example, step S141 to step S153 in FIG. 8) of the communication made between the guest terminal 30 and the Web server unit 2000 (step S130 to step S153 in FIG. 8) be made through protected communication. For example, the communication made between the guest terminal 30 and the Web server unit 2000 and related to the delivery of the connection information file is made with the Hypertext Transfer Protocol Secure (HTTPS) used as a communication protocol. Delivery of the connection information file can be more securely executed by making communication related to the delivery of the connection information file using the HTTPS.

In the second embodiment, OpenFlow is applied to the foregoing configuration according to the first embodiment. A system with which a person (a host user) in an organization determines, based on authentication information that a person (a guest user) outside the organization has notified of in advance and that the person has input, whether to permit the guest terminal 30 to connect to the network 10 can be more flexibly and easily configured.

REFERENCE SIGNS LIST 1a, 1b, 1c Network system
10 Network
11a, 11b, 11c Information device
12 Administrative server
20, 20' Communication control apparatus
30 Guest terminal
32 Host terminal
40, 40', 40" Authentication AP
41, 41', 41" Guest AP
42, 42', 42" Host AP
43 Wired LAN unit
201, 301 CPU
204, 305 Storage
212 Connection guiding unit
213 Authentication/connection control unit
214 Communication control unit
215 Wireless LAN control module
304 Display device
306 Input device
311, 321 Input unit 312, 322 Display unit
400 Login screen
410 Available-device registration screen
420 Communication management screen
430 Authentication information input screen
440 Authentication screen
2000 Web server unit
2001 Controller
2002 RADIUS server unit
2003 Captive portal unit
2004 I/O unit
2005 Switch unit

CITATION LIST

Patent Literature

PTL 1: Japanese Laid-open Patent Publication No. 2013-038498

The invention claimed is:
1. A communication system comprising:
processing circuitry configured to function as a
first communicator configured to communicate with a terminal apparatus,
a second communicator configured to communicate via a network,
an authentication unit,
a connection guiding unit,
a display unit,
an input unit, and
a connection control unit,
the authentication unit configured to transmit an authentication screen for inputting authentication information by a guest user, in response to access from the terminal apparatus, wherein the terminal apparatus is outside a network organization of a host user, and
to receive the authentication information input to the authentication screen,
the connection guiding unit configured to connect communication made from the terminal apparatus via the first communicator and addressed to any destination, to the authentication unit,
the display unit configured to display, to the host user, the authentication information input to the authentication screen and output by the terminal apparatus that has been connected to the authentication unit by the connection guiding unit and to which the authentication screen has been transmitted,
the authentication information being received by the authentication unit, the input unit configured to receive a user input by the host user,
the connection control unit configured to permit connection of the terminal apparatus to the network via the second communicator in accordance with the host user input received by the input unit according to display by the display unit when the host user input indicates that the host user authenticates the terminal apparatus after the display unit displays the authentication information that is input to the authentication screen transmitted by the authentication unit to the terminal apparatus and received by the authentication unit from the terminal apparatus,
the authentication information being input in the terminal apparatus by the guest user is separate from the host user input at the input unit by the host user,
the terminal apparatus is permitted to connect to the network via the second communicator after the terminal apparatus is authenticated via the first communicator.

2. The communication system according to claim 1, wherein the connection control unit terminates a connection via the second communicator after elapse of a previously determined time starting from when the connection is permitted.

3. The communication system according to claim 1, wherein the authentication unit transmits the authentication screen for inputting the authentication information in a form of an image.

4. The communication system according to claim 1, wherein the authentication unit controls start and termination of communication by the first communicator in accordance with an instruction.

5. The communication system according to claim 1, wherein the connection guiding unit transmits location information that indicates a location of the terminal apparatus on the network to the terminal apparatus in response to a request made by the terminal apparatus via the first communicator, and connects the communication made from the location information and addressed to any destination, to the authentication unit.

6. The communication system according to claim 1, wherein each time the connection is permitted, the connection control unit randomly generates information needed for communicating via the second communicator, and transmits the information to the terminal apparatus, the connection of which is permitted.

7. The communication system according to claim 1, wherein the connection control unit is capable of selecting an access level for the host user who provides host user input to the input unit, from among a plurality of access levels.

8. The communication system according to claim 1, wherein the connection control unit makes communication for permitting connection of the terminal apparatus to the network via the second communicator, through protected communication.

9. A communication method comprising:
connecting communication made from a terminal apparatus via a first communicator and addressed to any destination, to an authentication unit;
transmitting, by the authentication unit, an authentication screen for inputting authentication information by a guest user, in response to access from the terminal apparatus, wherein the terminal apparatus is outside a network organization of a host user;
receiving, by the authentication unit, the authentication information input to the authentication screen;
displaying, to the host user, the authentication information input to the authentication screen and output by the terminal apparatus that has been connected to the authentication unit at the connecting and to which the authentication screen has been transmitted,
the authentication information being received by the authentication unit;
receiving a user input by the host user; and
permitting connection of the terminal apparatus to the network via a second communicator in accordance with the host user input received according to display at the displaying when the host user input indicates that the host user authenticates the terminal apparatus after displaying the authentication information that is input to the authentication screen transmitted by the authentication unit to the terminal apparatus and received by the authentication unit from the terminal apparatus, the authentication information being input in the terminal apparatus by the quest user is separate from the host user input at the input unit by the host user, the terminal apparatus is permitted to connect to the network via the second communicator after the terminal apparatus is authenticated via the first communicator.

10. A non-transitory computer-readable medium including programmed instructions that cause a computer of a communication apparatus to execute:

connecting communication made from a terminal apparatus via a first communicator and addressed to any destination, to an authentication unit;

transmitting, by the authentication unit, an authentication screen for inputting authentication information by a guest user, in response to access from the terminal apparatus, wherein the terminal apparatus is outside a network organization of a host user;

receiving, by the authentication unit, the authentication information input to the authentication screen;

displaying, to the host user, the authentication information input to the authentication screen and output by the terminal apparatus that has been connected to the authentication unit at the connecting and to which the authentication screen has been transmitted, and the authentication information being received by the authentication unit;

receiving a user input by the host user; and permitting connection of the terminal apparatus to the network via a second communicator in accordance with the host user input received according to display at the displaying when the host user input indicates that the host user authenticates the terminal apparatus after displaying the authentication information received by the authentication unit that is input to the authentication screen transmitted by the authentication unit to the terminal apparatus and received by the authentication unit from the terminal apparatus, the authentication information being input in the terminal apparatus by the quest user is separate from the host user input at the input unit by the host user input, the terminal apparatus is permitted to connect to the network via the second communicator after the terminal apparatus is authenticated via the first communicator.

11. The communication system according to claim 1, wherein the authentication unit is further configured to randomly generate a file name for a connection information file, the connection information file including information to be used by the terminal apparatus for the connection of the terminal apparatus to the network, and to provide a URL including the randomly generated file name to the terminal apparatus for retrieval of the connection information file by the terminal apparatus.

* * * * *